Nov. 11, 1952  G. T. RANDOL  2,617,310
AUTOMOTIVE TRANSMISSION CONTROL
Filed July 29, 1947  5 Sheets-Sheet 1
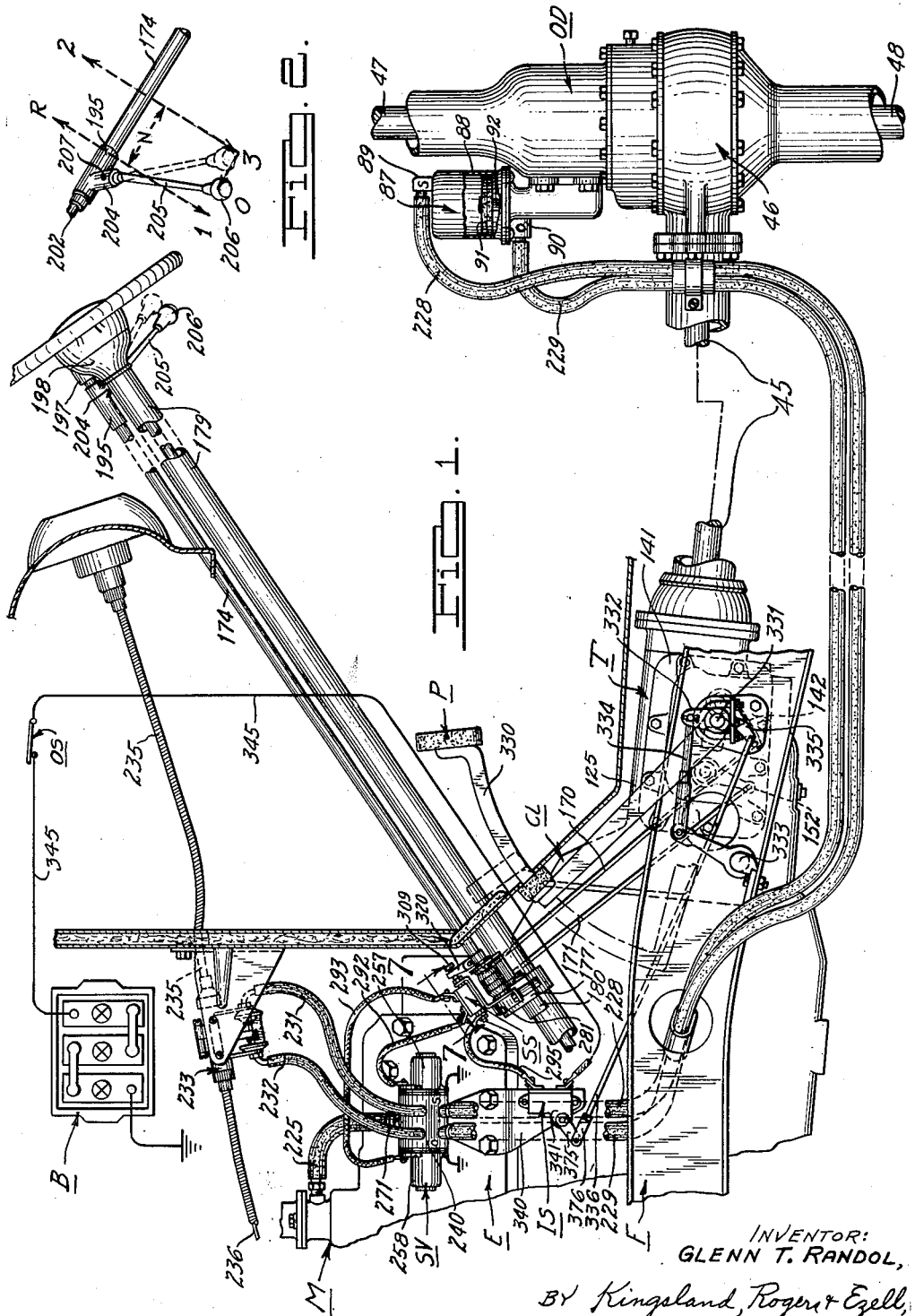
INVENTOR:
GLENN T. RANDOL,
BY Kingsland, Rogers & Ezell,
HIS ATTORNEYS.

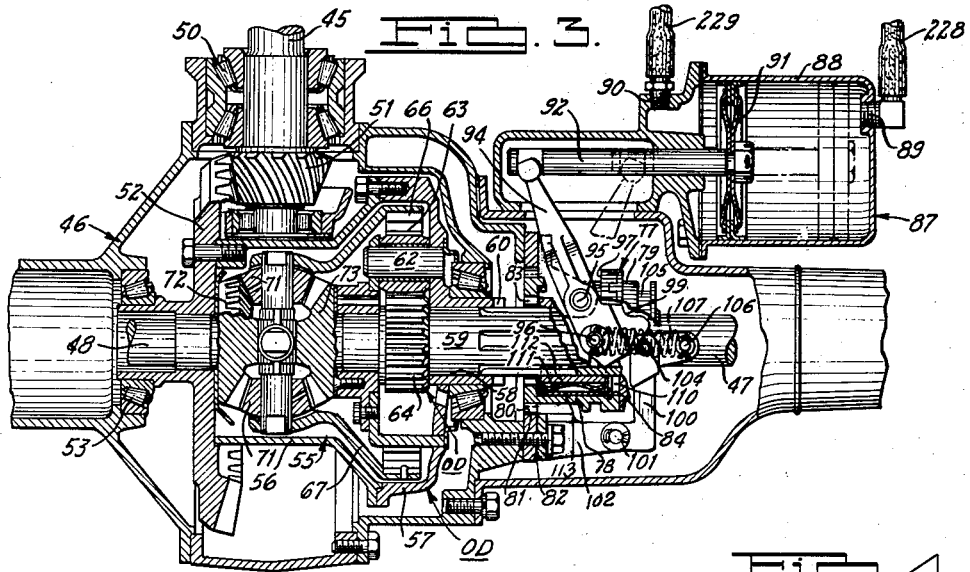
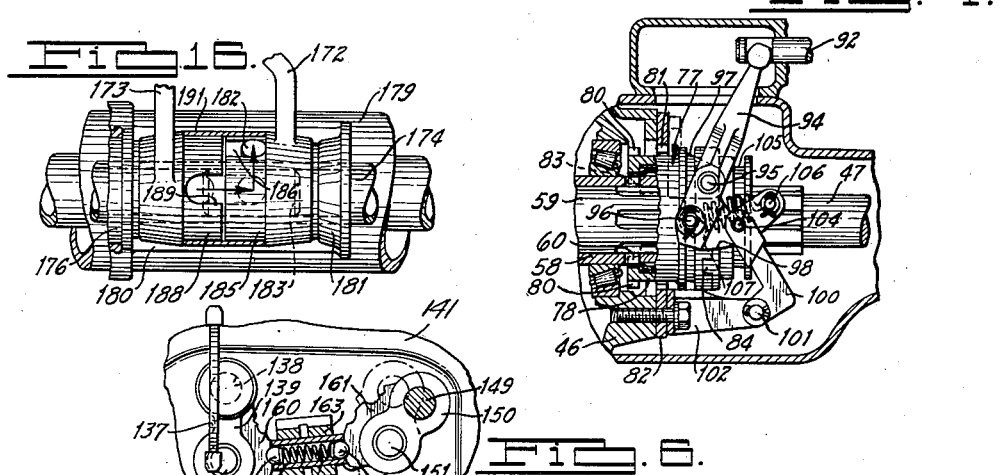
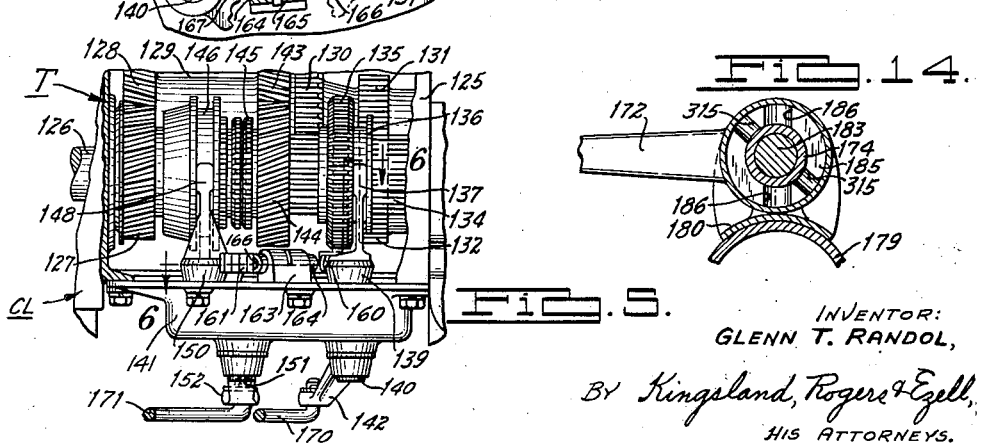

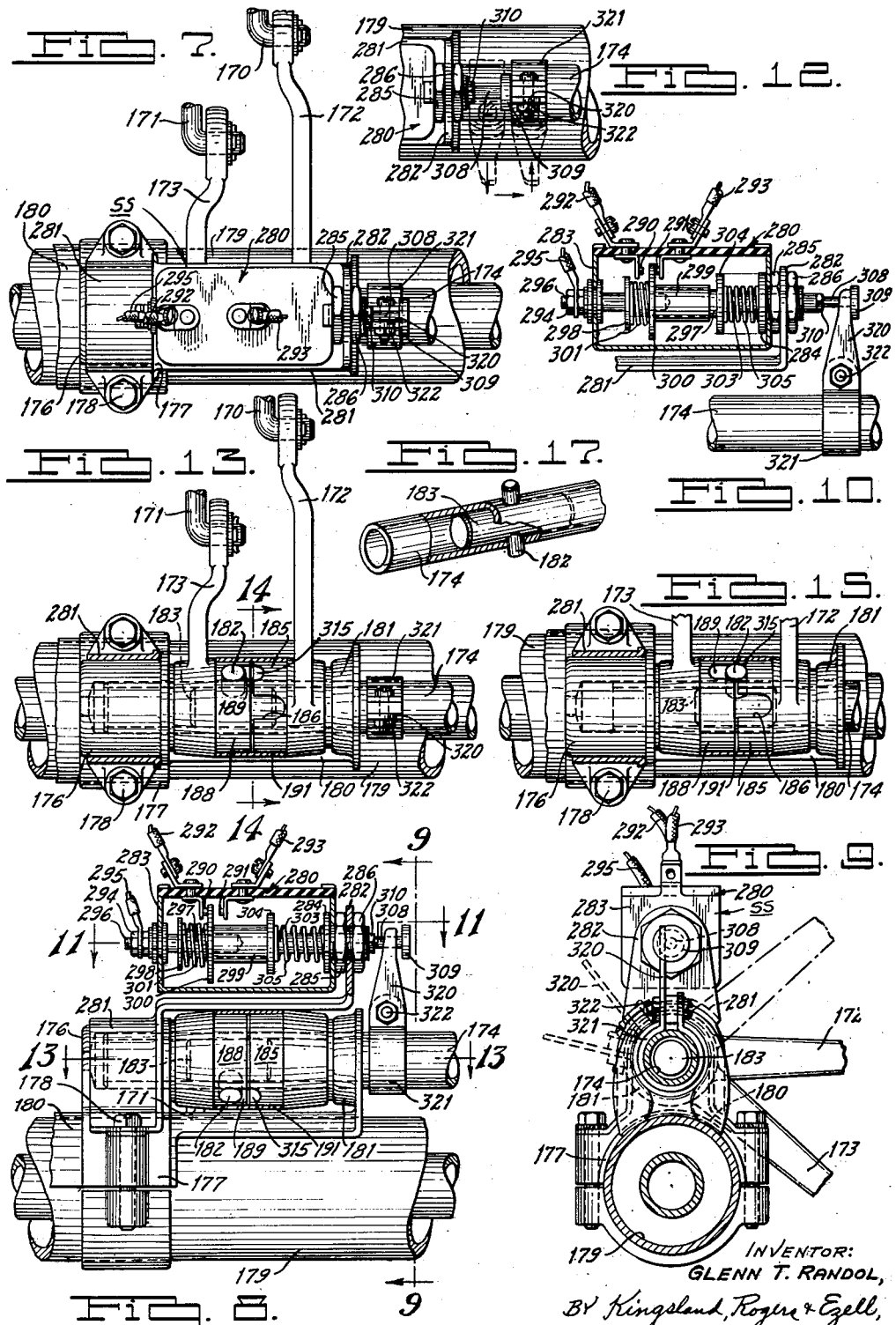

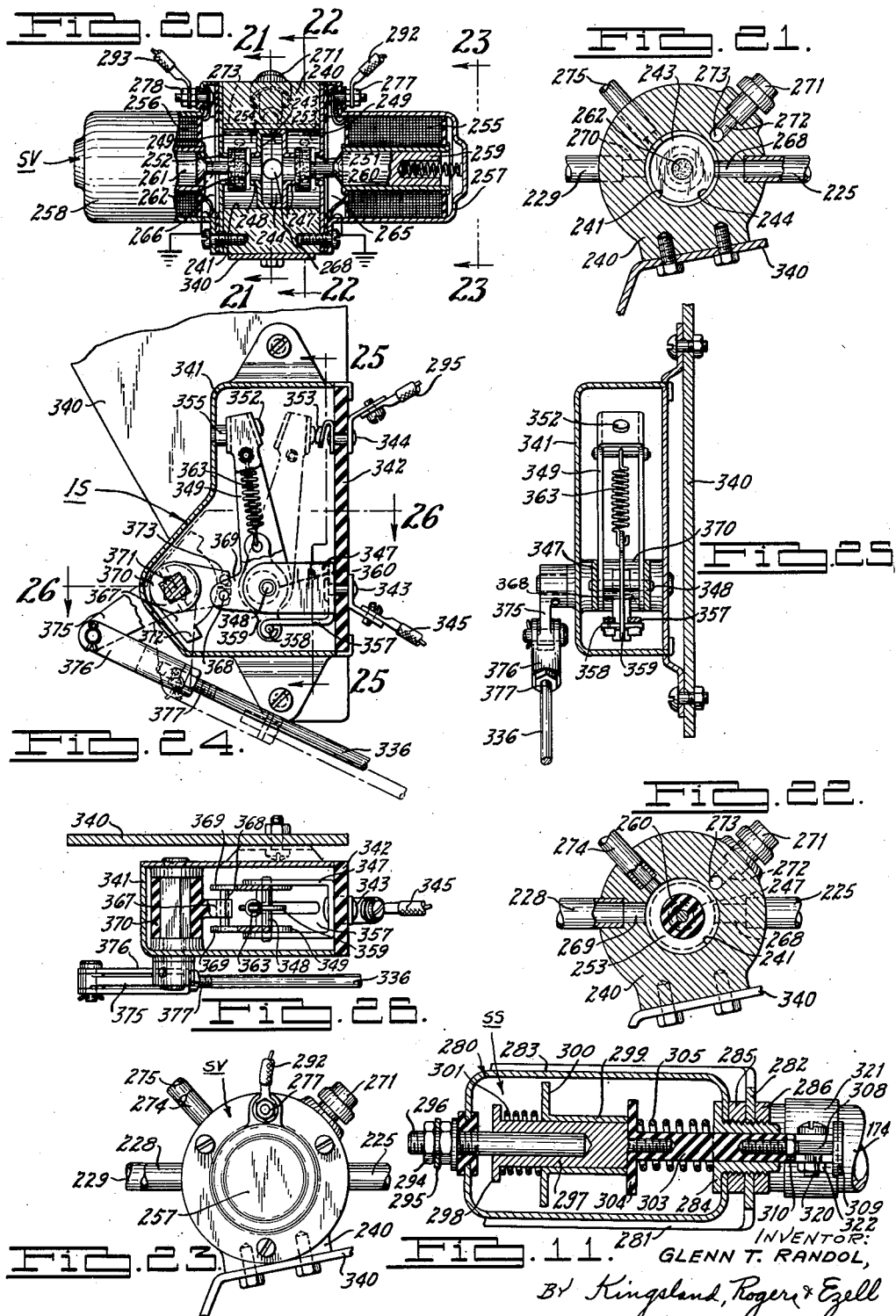

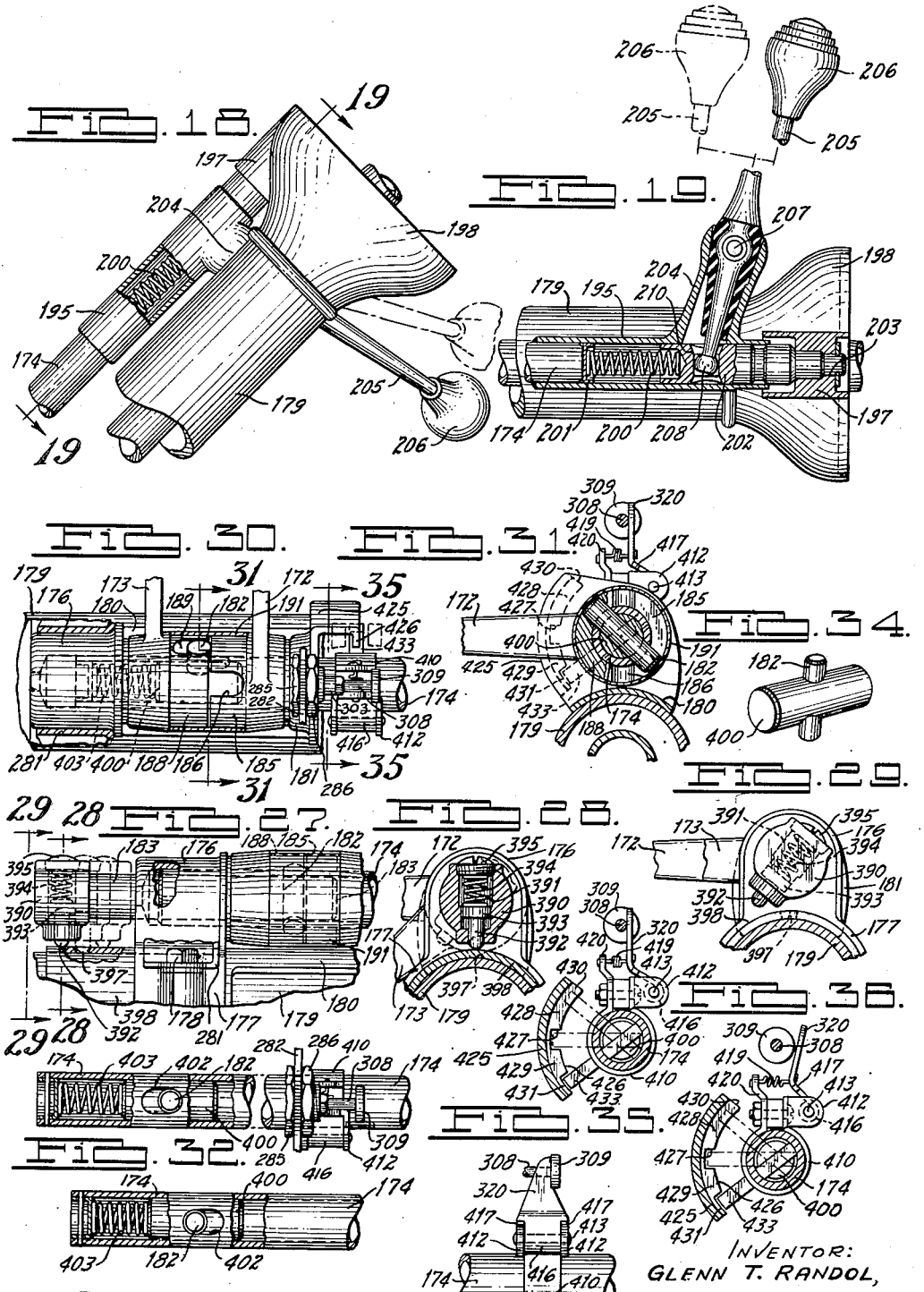

Patented Nov. 11, 1952

2,617,310

UNITED STATES PATENT OFFICE 2,617,310

AUTOMOTIVE TRANSMISSION CONTROL

Glenn T. Randol, Fort Lauderdale, Fla.

Application July 29, 1947, Serial No. 764,342

47 Claims. (Cl. 74—334)

The present invention relates in general to automatic power transmission controls. In particular, it relates to a control for transmission change-speed mechanism having a plurality of speed drives, one of which may be designated a supplemental speed drive and seeks among other objects to improve the transmission control disclosed in my co-pending earlier U. S. application Serial No. 745,010, filed April 30, 1947, by providing the preselective supplemental movement of the gear-shift lever from a gear operative position thereof without increasing the sweep of said lever beyond that normally required to operate the main change-speed gearing. Other improvements reside in the use of electromagnetically operated controls to accelerate the overdrive shifting cycle and facilitate installation as well. In the preferred embodiment of the invention, this supplemental drive is one obtained by an overdrive mechanism that is part of the overall transmission mechanism of the vehicle, but is conventionally distinguishable from the regular transmission. It will be understood, however, that certain features of the present control mechanism may be embodied in transmission mechanisms that do not have what is technically known as an overdrive. Furthermore, it will be understood that, where the term "overdrive" is used, it is used in its broad sense as being a superposed gear ratio that is accumulated with one of the conventional transmission drives; and it will be further understood that the particular speeds that are obtained by the transmission drive and by the overdrive are not necessarily those in which the final driving shaft rotates more rapidly than the engine rotates.

The invention is primarily related to sliding gear types of transmissions, and, in the illustration, it embodies a planetary type of overdrive having two speeds. It will be evident from the description and claims to follow that, while the invention is primarily related to the operation of sliding gear transmissions and overdrives, it may, in some features, be embodied with other types of change-speed mechanisms.

It is a primary object of the invention to provide a control for transmission mechanisms wherein the gear shift lever or gear shifter control means actuates not only some regular speed drive but also a supplemental speed drive, without disestablishing the regular speed drive upon establishing of the supplemental speed drive. Specifically, it is an object of the invention to provide means to establish the supplemental speed drive that is operated by a supplemental movement of the shifter control, particularly where that control is the hand lever conventionally used for operating the regular transmission. It is an especial object to attain the foregoing in a combination with a regular transmission with an overdrive.

A further object is to provide the foregoing combination of a shifter control element, and particularly a hand shift lever, wherein the hand shift lever preselects the supplemental speed drive and there are additional control means for finally establishing the supplemental speed drive. It is an object to make this supplemental control manually-operatable (i. e., in the sense that it is operated by the operator of the transmission).

It is a particular object of the invention to provide the supplemental movement of the shifter lever for the purpose aforesaid in such wise that it can be produced by a finger tip movement by the operator, which is, in the preferred form, an upward movement of the hand lever similar to the upward movement obtained when the shifter is moved across the neutral gate of the H-pattern in a conventional shift.

Another important object related to that last stated is to provide manually controlled supplemental movements to a conventional transmission gear shifter lever settable to two positions for selectively controlling at least one of the transmission speed drives and another speed drive of the transmission or one auxiliary thereto, and wherein the return movement of the gear shifter lever may be automatic, if desired.

A specific object of the invention is to provide a selectively operable control for a transmission with a superposable supplemental speed drive, such as an overdrive, so arranged that the supplemental speed drive can be superposed on only one specific conventional speed drive. A further object is to provide a control such that the conventional speed drive cannot be neutralized without disestablishing the supplemental speed drive. Stated differently, it is an object to provide a control that prevents the fortuitous superposing of the supplemental speed drive on speed drives of the conventional transmission other than a particular chosen one, thereby to prevent the loss of acceleration capacity of the engine in its other speed drives. A particular object of the invention is to provide a control as aforesaid that is actuated by the hand shifter lever into an overdrive or supplemental speed position, so arranged that only from such supplemental position can the supplemental speed be effected, and so that, upon return of the hand shift lever from the supplemental position, the supplemental speed drive will be rendered ineffective.

A particular object of the invention is to arrange the control apparatus so that, when the hand shift lever or its counterpart is moved to overdrive position, the overdrive operation is preselected, and, when the second control is operated, the overdrive operation is completed; and wherein, when the hand lever is subsequently released, it automatically returns to conventional drive position and preselects conventional drive, whereupon, when the second control is again operated, conventional drive is obtained again. A further object of the invention is to provide an alternate construction, wherein, when the first control, or specifically the hand shift lever, is moved to its overdrive position, it will be yieldably retained in such overdrive position until positively displaced therefrom, so that subsequent operation of the second control will produce overdrive, or supplemental speed drive, and that all other subsequent operations of the second control will not change the transmission mechanism back to conventional drive until the first control is positively replaced in conventional drive position.

A further object of the invention is to provide a preselection control for transmission mechanisms wherein two controls are required to operate simultaneously to effect a supplemental speed drive, and wherein a time delay means is inserted in one of these controls so as to insure that, in a given type of operation, both controls may be held in operative position for a length of time sufficient to insure the effecting of a supplemental speed drive.

A further specific object of the invention is to provide a second control means as aforesaid that is manually-operated, and particularly one that is operated as a standard part of the operation of an automobile. In further particularization, it is an object of the invention to provide a second control that is interrelated with the clutch operation of the vehicle, so that, after preselection has been made by the hand lever or first control, the actual effecting of the shift to the supplemental speed or return will be made by the clutch operation, which is thus coordinated with the supplemental movement of the hand shift lever.

A further object of the invention is to provide a transmission mechanism having the conventional manually-operated shifter mechanism for primary speeds, together with a preselected final speed drive that is power-operated, that cannot be superposed upon any speed drive of the conventional transmission except a chosen one, that is under the control of the shifter of the transmission, that is caused to operate back to conventional drive whenever the control for the principal transmission is moved to a drive position, such as, direct drive.

A particular object of the invention is to provide an overdrive or the like that is controlled by a control lever on the steering column.

A specific object of the invention is to provide a control of the foregoing type wherein the operation is effected by a novel combination of electrical and vacuum mechanisms.

More particularly, it is an object of the invention to provide a control, especially one for overdrive, wherein the actual final shift is obtained by a vacuum means and the vacuum means are subjected to electrical and electromagnetic control mechanisms. In further detail, a specific object of the invention is to provide a control as aforesaid wherein there is an electrical switch operated by the shifter device for the regular transmission in a predetermined movement thereof, and wherein the second control consists of an interrupter switch device that is in series with the first switch, whereby preselection may be made by operating the conventional shifter control and final operation can be made by operating the second control while the conventional control remains in its operated position.

A further object of the invention is to provide the foregoing results with only minor changes in existing transmission mechanisms. Specifically, it is an object of the invention to provide such control wherein the modifications of the existing mechanisms involve changing only a small number of parts in the shifting apparatus at the lower part of the steering mechanism, and the addition of other control elements by simple attaching means to the existing structure.

A further object of the invention is to provide overdrive that is a true complement to ordinary operations of a conventional transmission.

In the drawings:

Figure 1 is a partly schematic elevation of a controlling system incorporating the present invention, applied to an automobile;

Figure 2 is a schematic view of the hand gear shifting lever and associated control shaft, viewed from the lever side of the vehicle, with a diagram of the positions of movement of said lever to effect the several conventional transmission and overdrive conditions;

Figure 3 is a longitudinal sectional view of an overdrive unit incorporated in the rear axle of the vehicle, parts being shown in overdrive position;

Figure 4 is a fragmentary longitudinal sectional view of the shifting mechanism of the overdrive unit moved to engage direct drive 1 to 1 ratio;

Figure 5 is a plan view of a three-speeds forward and reverse gear transmission of conventional design, shown in third or direct drive condition;

Figure 6 is a view taken on the line 6—6 of Figure 5, and showing the yieldable detent and interlocking mechanism;

Figure 7 is a plan view of the mechanism at the lower end of the steering column, taken approximately on the line 7—7 of Figure 1 and showing, in third speed positions, the shift control shaft, the selector switch and the shifter arms;

Figure 8 is a side view of the lower steering column of Figure 7 in third speed position, with the selector switch shown in vertical section;

Figure 9 is an end view of the lower steering column mechanism in third speed position, taken approximately on the line 9—9 of Figure 8;

Figure 10 is a vertical section of the selector switch mechanism appearing in Figure 8, but in the overdrive position;

Figure 11 is a horizontal section through the selector switch mechanism in direct drive position, taken on the line 11—11 of Figure 8;

Figure 12 is a plan view of a fragment of Figure 8, showing the selector valve finger in certain of its positions;

Figure 13 is a section of the lower steering column mechanism, taken on the line 13—13 of Figure 8, showing the means for converting movements of the shift control shaft into movements of the shifter arms, the parts being in third gear position;

Figure 14 is a transverse section taken on the line 14—14 of Figure 13 through the shift control shaft, showing details of the notched hub of first gear and reverse shifter arm in its neutral positions;

Figure 15 is a section similar to Figure 13 with the parts operated to overdrive positions;

Figure 16 is a view similar to Figure 12 with the parts shown in first gear position;

Figure 17 is a perspective view partly in section, showing the cross pin mounting;

Figure 18 is an enlarged view of the hand lever and shifting control shaft assembly at the upper end of the steering column;

Figure 19 is a sectional view of the upper steering column assembly, taken on line 19—19 of Figure 18;

Figure 20 is an elevation of the selector valve assembly, partly in vertical medial section;

Figure 21 is a transverse section through the middle of the valve body of Figure 20, taken on the line 21—21 thereof;

Figure 22 is another transverse section through the valve body in Figure 20, taken on the line 22—22 thereof;

Figure 23 is an end view of the selector valve assembly, taken from the right end of Figure 20;

Figure 24 is a vertical section through the interrupter switch mechanism actuated by the clutch pedal of a motor vehicle;

Figure 25 is a vertical section of the switch of Figure 24, taken at right angles to Figure 24 on the line 25—25 thereof;

Figure 26 is a transverse horizontal section through the interrupter switch, taken on the line 26—26 of Figure 24;

Figure 27 is a modified view partly broken away, related particularly to Figures 7, 8 and 9, of a yieldable selective detent device for holding the hand shift lever in the overdrive position and shown in third speed position;

Figure 28 is a transverse cross-sectional view through the left end of the mechanism of Figure 27 on the line 28—28 thereof;

Figure 29 is an end view from the left end of Figure 27, taken on the line 29—29 thereof, showing the detent mechanism with the hand lever in neutral position;

Figure 30 shows an additional modification wherein the cross pin is yieldably mounted in a manner to eliminate certain indentations in the hub of the first and reverse gear arm;

Figure 31 is a transverse section on the line 31—31 of Figure 30;

Figure 32 is a plan view partly in section of the cross pin parts associated with the end of the shifter control shaft as used in the arrangement of Figure 30, the parts being shown in direct drive condition;

Figure 33 is a view similar to Figure 32, but with the parts shown in overdrive position, as in Figure 30;

Figure 34 is a perspective view of the plunger and cross pin unit for use with the construction of Figure 30;

Figure 35 is a section on the line 35—35 of Figure 30, showing a spring safety device associated with the selector switch finger;

Figure 36 is a view similar to Figure 35, but showing the selector switch finger in a permissible extended position; and Figure 37 is a side elevation of the selector switch finger mounting of Figures 35 and 36.

This invention has a particular use and value in connection with motor vehicles or the like having one of the known forms of sliding gear transmissions, and also having one of the known forms of power-driven overdrive mechanisms. It further has particular adaptation to such vehicles wherein the shifting of the transmission is effected by a lever mounted on the steering column adjacent the steering wheel.

It will be understood from the description to follow that the cycle of operation and various features of the mechanism are clearly adaptable to other assemblies than the foregoing. This cycle relates to the establishment and disestablishment of a certain gear ratio drive between an engine and a driven shaft, relatively to and beyond another drive. More particularly, it involves the establishment of a certain speed drive, such as the high or direct drive 1 to 1 ratio, by a conventional means, such as a hand lever; together with the preselection by that same means of another speed drive, with the ultimate establishment of that other speed drive effected by a second operation; and wherein the second speed drive is always disestablished upon return to the first one, whether by return of the hand lever or the re-performance of the second operation.

In the illustrated embodiment of this invention, the gearing includes a conventional sliding gear transmission that affords three forward speeds and a reverse, together with an overdrive unit that is power-actuated to change the gear ratio between the driven shaft out of the transmission and the ultimate rear axle. Also, in the particular illustrated embodiment, the transmission is shifted by a conventional steering column lever, and the engine is connected or disconnected from the transmission by a conventional friction clutch operated by a clutch pedal. When the transmission is shifted by the hand lever to its third speed drive, and only then, the linkage is arranged to enable the hand lever to be drawn into a new position wherein a valve (preferably electrically operated) is opened for the transmission of power fluid to actuate the overdrive mechanism into overdrive position. However, the control for this valve is in series with another control that must be operated by the clutch pedal before the overdrive shift can be rendered effective.

In Figure 1, wherein the invention is applied to a conventional automobile, there is an automobile frame "F," supporting an engine "E," having a clutch "CL," indicated by its housing, and a transmission "T," indicated by its housing. As is well known, the engine E is connected through the clutch CL with the transmission T. The clutch CL is operated in this illustration by a conventional pedal "P." A propeller shaft 45 leads backwardly from the transmission housing into a rear axle housing, generally designated at 46. This rear axle housing here encloses not only a conventional differential, but also a planetary overdrive "OD," that is power actuated. The overdrive here illustrated is of a commercially used construction built together with the differential mechanism. From the housing 46, the two axle sections 47 and 48 lead to the rear wheels of the vehicle.

*The overdrive and its operation*

Reference to Figures 1 and 3 shows the propeller shaft 45 entering the rear axle housing, generally indicated at 46. The propeller shaft is provided with suitable bearings 50, and has on its inner end a beveled pinion 51 that meshes with a ring gear 52. The ring gear has bearings 53 by which it is supported at one point in the housing 46. The ring gear likewise has an overdrive planetary gear cage made up of several generally circular sections and generally indicated at 55. The first section 56 of this cage is attached to the ring gear and extends axially toward the right thereof in Figure 2. The right-hand section 57 of this cage extends inwardly toward the axis and is connected fixedly with a collar 58 rotatable on a splined sleeve 59. The outer edge of the sleeve part 58 is provided with crown clutch teeth 60, for a purpose that will appear.

The end section 57 of the cage attached to the ring gear 52 has stud shafts 62 about the center thereof, that rotatably support a plurality of planetary gears 63. These gears mesh with a sun gear 64 that is secured to the sleeve 59.

The planetary gears 63 likewise mesh with internal teeth on a planetary ring gear portion 66 formed as a projection of a cage 67, extending back within the outer cage 55, the inner cage supporting the conventional differential spider gears 71. These spider gears 71 engage with the driving gear 72 on the shaft 48 and the gear 73 on the shaft 47, to effect the ultimate drive of the vehicle.

The overdrive control includes a composite clutch collar device 77 mounted on the splined sleeve 59 that is attached to the sun gear 64. This collar 77 has, at its left-hand end, as it appears in Figures 3 and 4, a first or inner selector sleeve 78 that is slidable on the sun gear sleeve 59. The selector sleeve 78 has external radial clutch teeth 80 on its left-hand end that are adapted to engage with corresponding clutch teeth 81 on the interior of an annular brake plate 82 secured to the main housing 46. When the teeth 80 and 81 are engaged, the selector sleeve 78 will be held against rotation.

The selector sleeve 78 of the collar 77 has also internal clutch teeth 83 that are disposed radially inwardly from the teeth 80. These teeth 83 are adapted to be meshed with the crown teeth 60 on the end of the sleeve projection 58 of the cage 55 of the main ring gear 52. This latter engagement is effective when the collar 77 is shifted inwardly to the position of Figure 4.

The collar device 77 is also associated with an outer clutch member 79 that has internal splines (not shown) by which it is caused to rotate with the sun gear sleeve 59. There is a dog clutch arrangement 84 by which the inner selector sleeve 78 and the outer member 79 may be selectively engaged for rotation together. When the dog clutch 84 is engaged, the inner sleeve will be fixed with the sun gear sleeve 59, whereas, when the dog clutch 84 is opened, the inner sleeve is rotatable relatively to the sleeve 59.

From the foregoing, it may be seen that, when the clutch collar 77 is in the position of Figure 3, wherein it is locked against movement, by engagement of the teeth 80 and 81, the dog clutch and the spline, the sun gear 64 is correspondingly locked against movement, the drive from the main ring gear 52 will pass through the cage 55, which carries the planetary gears 63 in mesh with the internal gear teeth 66 on the main differential cage 67. As the sun gear 64 is locked, the planetary gears 63 must roll around the sun gear 64, and correspondingly move the main cage 67 at a higher rate of speed than that of the main ring gear 52, this being the overdrive condition.

If the collar 77 is moved inwardly to disengage the teeth 80 and 81 and to engage the teeth 83 and 60, as shown in Figure 4, direct or conventional gear ratio drive will result. In this arrangement, the drive from the main ring gear 52 and its cage 57 continues through the sleeve extension 58 and the collar 77, which is nonrotatable with respect to the sleeve 59 and the sun gear 64. Consequently, the sun gear 64 will rotate at the same rate of rotation of the main cage 57. As a result, the planetary gear 63 will not rotate, but will turn about the main axis of the differential cage 67, and direct drive will result.

The operational sliding movement of the collar 77 is effected by a differential fluid pressure mechanism, generally indicated at 87. It includes a cylinder 88 having a fluid port 89 at one end and a fluid port 90 at the other end. A piston 91 is slidable within the cylinder 88, and has a piston rod 92 connected thereto. These parts are mounted on the side of the axle housing.

The piston rod 92 is adapted to actuate a lever 94 that is pivoted at 95 to the housing. The operating end of the lever 94 is provided with a clutch collar pin 96, having a shoe engaging in an annular groove 97 in the selector sleeve 78 of the collar 77. The operating end of the lever 94 also has a curving cam edge 98 that is notched at 99.

There is a rocking lever 100, pivoted at 101 to a bracket 102, which bracket extends outwardly from the end of the differential and overdrive housing 46 and is attached with the plate 82 to the housing 46. The lever 100 has a pin 104 with a shoe that engages in a peripheral groove 105 around the end of the outer splined member 79 of the collar member 77. It also has an extended end 106. A coil spring 107 is put under tension and connected between a pin at the end of the arm 106 of the lever 100, and between the clutch collar pin 96 on the operating end the lever 94. These parts are preferably disposed in the indicated relationship shown in Figures 3 and 4.

By the foregoing means, when the piston 91 is caused to move to the right in Figure 3, the operating lever 94 will rock clockwise in Figure 4 about its pivot 95. This will move its operating end to the left. The pin 96 has a connection in the groove 97, so that this leftward movement of the operating end of the lever 94 can displace the inner collar sleeve 78 leftwardly. Such clockwise movement of the lever 94 also will rock the cam 98 about its center 95. The roller 104 will be held against the cam edge by the spring 107, but the shape of the cam edge prevents the outer clutch member 79 from moving to the left during the initial movement of the inner sleeve element 78, and until the dog clutch 84 is disengaged.

After a predetermined movement of the operating lever 94 rocking the cam 98, the pin 104 will move around the edge of the bottom end of that lever, and then will rapidly "snap" into the notch 99 under action of the spring. This latter movement will cause the lever 100 to rock, and, as the pin 104 is engaged in the groove 105 of the collar, it will cause the collar to shift to the left under the action of the spring, and to bring the teeth 83 into mesh with the teeth 60, to establish the condition of Figure 4.

From the position of Figure 4, the mechanism may be reversed to the position of Figure 3. In this, when the operating lever 94 is rocked counterclockwise, initial movement will displace the pins 96 to the right, causing the inner collar element 78 and the outer collar element to move, and to disengage the collar teeth 83 from the sleeve teeth 60. In this operation, the rocking of the lever 94 will rock the cam 98, to displace the pin 104 on the lever 100. The pin will be moved around the end of the cam, separating the collar sleeve 78 and member 79 at the clutch 84, and finally releasing them to reengage by the spring 107 when the pin is on the end edge of the cam. During an intermediate part of this movement of the lever 94 as described, the sleeve element 78 is free on the sleeve 59, as it is disengaged from the splined clutch element 79; but at the end of the movement the inner sleeve element 78 is fixed to the sleeve by being clutched at 84 to the outer member 79. At the end of the movement, the clutch teeth 80 are reengaged with the fixed teeth 81.

Synchronizing means are provided between the inner selector sleeve 78 and the sun gear sleeve 59. There is a pocket or cavity 110 that extends arcuately around the inner surface of the sleeve element 78. This pocket receives a plurality of leaf springs 111 that act between arcuate plates 112, splined to the sleeve 59, and friction shoes 113 that slide against the surface of the cavity 110. This arrangement causes the inner sleeve 78 to tend to have the same rotation as the sleeve 59 and the outer splined member 79 which is attained during their interval of separation caused by disengagement of the dog clutch 84.

The primary transmission

The conventional primary transmission T illustrated in this embodiment of the invention is shown fragmentally in Figure 5. It may be enclosed within a transmission housing 125, into which is brought a driving shaft 126 from the clutch and the engine. A gear 127 is mounted on the driving shaft 126, and is in constant mesh with a countershaft gear 128 that rotates a countershaft 129.

The countershaft has the conventional first ratio countershaft gear 130 and a similar reverse countershaft gear 131, the latter driving through an idler gear 132.

The driven shaft has a spline 134 thereon which receives a first and reverse gear 135, which has a shifter collar 136 attached thereto. The shifter collar receives a fork 137 that is mounted upon a pin 138 on a crank 139 that is attached to a shifter fork shaft 140 extending out through the housing. This shaft 140 has a shifter arm or crank 142 on its outside end.

When the arm 142 is moved to the right in Figure 5, the shifter fork 137 will be moved to the left to bring the gear 135 into mesh with the first speed countershaft gear 130, to establish first speed ratio drive. When the fork 137 is moved to the rear by a leftward movement of the crank 142, the gear 135 will mesh with the reverse idler 132 and establish reverse gear ratio drive between the shaft 126 and the driven shaft.

The countershaft 129 has a gear 143 constantly meshing with a gear 144 that is rotatably mounted adjacent the spline 134. Second and third drives are established by clutch engagement effected by a synchronizer blocker assembly 146, that is shiftable forward or backward in the conventional manner, and is fixed to rotate with the driven shaft. It is moved by a fork 148 that is rockable upon a pin 149 in an arm of the inner crank 150. This inner crank is mounted on a shifter shaft 151 that projects through the housing and has a shifter arm 152 extending therefrom.

When the shifter arm 152 has its lower end moved to the left, the fork 148 will be moved to the right. This will cause the synchronizer blocker assembly 146 to move to the right and engage with the second speed gear 145 to establish second speed drive. When the fork is moved to the left by a right-hand movement of the lower end of the shifter arm 152, the locker assembly will engage with teeth adjacent the gear 127 to establish direct drive. This position is shown in Figure 5. It will be understood, as is conventional in the art, the blocker assembly 146 is splined to the driven shaft.

There is a lock-out mechanism used on transmissions of this kind, so that, when one shifter fork is operated, the other one is held immovable in a neutral position. Figures 5 and 6 show the transmission in direct drive, or third speed, since the gear 135 is disengaged from and is between the two gears 130 and 132; and the blocker assembly 146 is disengaged from the teeth 145 associated with the second gear 144 and engaged with the teeth associated with the direct drive adjacent the gear 127.

The detent and lock-out selector mechanism (Figure 6) includes two cams 160 and 161 on the cranks 139 and 150, the cams facing each other. Each cam has three notches indented into its generally arcuate edge. Between them and mounted on the transmission cover plate, there is a block 163 that slidably receives a sleeve 164. This sleeve contains a coil spring 165 acting against and tending to spread two balls 166 and 167, which balls may engage in one or another of the notches in the two cams. The two middle notches in the cams represent the neutral position.

The edges of the two cams are provided with flattened edges at right angles to a radius of the cams through the middle of the neutral notches immediately adjacent each side of the neutral notches, thus reducing the radial extent of these two cams thereat. This results in having a relatively greater maximum distance between the opposed cam edges when both are in neutral, a somewhat lesser intermediate distance when one is in neutral and the other rocked from neutral; and a small or minimum distance when both are rocked from neutral.

The sleeve 164 is located between the opposed cam edges. Its length is the length of the intermediate distance aforesaid; so that it is smaller than the maximum distance when both cams are in neutral, and it is longer than the minimum distance when both cams are rocked away from neutral.

Hence, from neutral position, either shifter fork shaft may be rocked from neutral, but, when one is so moved, the end of the sleeve 164 is caused firmly to abut the flattened edges adjacent the neutral notch of the other cam. The shaft of the other cam is then held immovable, because any attempt to rock it would require displacement of its cam, which would shorten the distance between the two cams to the minimum distance, which is less than the length of the sleeve 164.

The foregoing mechanism constitutes a means to prevent the operation of one of the shifter forks from its neutral position when the other is in a gear establishing condition.

The steering column shift actuator

The shifter arm 142 is adapted to be actuated by a rod 170, and the other shifter arm 152 is adapted to be actuated by a rod 171. These two rods extend in suitable manner to the lower end of the steering column. At the end of the steering column, the rod 170 is pivotally connected to an arm 172, and the rod 171 is similarly connected to an arm 173 (cf. Figure 7). These two arms are rockably mounted upon a steering column shifter shaft 174, and are selectively connectable therewith by a means to be described.

The shaft 174 adjacent the steering column is shown to be hollow at its lower end. It is supported rotatably and slidably at its end in a bearing 176 that is formed preferably as part of a split type of clamp 177. The parts of the clamp may be attached together, as by cap screws 178, around the outer steering column 179. The upper portion of the clamp 177 likewise encloses and clamps the end of of a bearing bracket 180 that extends upward along the steering column and has an upstanding bearing 181 that slidably and rockably receives the shifter control shaft 174 and provides an end limiting means for the shifter arm arrangement to be described.

The shifter shaft 174, at a point between the two arms 172 and 173, receives a cross pin 182 that preferably is formed with a rod portion 183 (Figure 17) that is welded or otherwise additionally fixed within the hollow shaft 174, this structure affording great strength.

The first and reverse arm 172 has a widened hub portion 185 that is rotatable upon the shaft 174. Conventionally, such hub portion 185 is provided with diametrically opposed notches 186. In similar manner, the second and high speed arm 173 is provided with a widened hub portion 188 that has end-face engagement with the hub portion 185 on the other arm 172. Conventionally, also, the hub portion 188 has opposite notches 189 diametrically arranged therein. These two hub portions are confined against endwise movement by the thrust and support bearing 176 and 181.

The disposition of the parts is such that the cross pin 182 is disposed for engagement within the slots or notches 186 and 189. It will be understood that the shift control shaft is capable of limited axial movement and limited rocking movement. From neutral position, the cross pin 182 may slide into either the notches 186 or the notches 189 by axial displacement of the shift control shaft 174. When it is moved into one or the other of the two sets of notches 186 and 189, the shift control shaft may be rocked clockwise or counter-clockwise so as to rock the chosen one of the hubs, and consequently to rock the chosen one of the arms 172 or 173. These hubs preferably receive an enclosing ring 191.

The operation of the shift control shaft 174 is effected at the upper end of the steering column to which the shaft extends. The upper end of the shaft 174 (Figures 18, 19, sheet 5) fits into and is secured, as by welding, in a tubular extension 195. The upper end of this extension is loosely shrouded by a protective boss 197 integral with the hub 198 of the upper end of the steering column 179.

Within the tubular extension 195, there is a coil spring 200 that acts against a cup-like element 201, secured in place as by welding, to form a lower abutment for the spring. The other end of the spring applies pressure to a pilot plug 202 which is anchored in a bearing 203 integral with the boss 197 of the upper end of the steering column, for rotational movement only in unison with the sweep of the handle 206 in shifting the gearing of the primary transmission, to thus urge downwardly the sleeve 195 toward the lower end of the boss 197, which enables the spring 200, when released, to automatically preselect the transmission speed drive condition of the overdrive following a shift to overdrive ratio, so that the operator need only fully depress the clutch pedal to cause a shift back to conventional drive for power and/or acceleration when needed.

The sleeve 195 has a laterally extending fixed projection 204 in which the shifter lever is mounted. The shifter lever 205 has a handle 206, and is pivoted at 207 at the outer part of the extension 204. The inner end 208 of the hand shift lever fits into a transverse cutout 210 in the pilot plug 202.

It will be seen that the spring 200, by acting against the upper end of the shift control shaft 174 and against the plug 202, normally urges the shift control shaft 174 downwardly. When the handle 206 is drawn upwardly, it, by the pin connection 207 with the extension 204, and by the resilient connection 208 through the spring 200, with the shift control shaft, relieves the spring 200 and draws the entire shift control shaft upwardly. When the handle 206 is released, the spring 200 will spread the parts and force the shift control shaft 174 downwardly.

It will be understood that, when the shaft 174 is drawn to upper position, or is released to lower position, it may be turned to rock the shaft 174 in either direction, and thereby to effect one or the other of the primary transmission gear engagements. The pattern of the shift is indicated in Figure 2. If the lever handle 206 is drawn to upper position (leftward in Figure 2), and then rocked downwardly, the gear ratio established will be first or lowest speed drive. This comes about because drawing the shaft 174 to upper position pulls the cross pin 182 into the notches 186 of the hub 185 on the shifter arm 172, and the subsequent rocking movement moves the arm 172 clockwise, when viewed from the top of the steering wheel, transmitting force through the pin 182 to the hub 185 to rock the latter to the position of Figure 16 (sheet 2). The arm 172 is thereby rocked to apply thrust to the rod 170, thereby moving the bottom of the shift arm 142 in Figure 5 to the right, throwing the gear 135 into mesh with the low speed countershaft gear 130.

It will be equally evident that reverse gear is established by moving the handle 206 in a counterclockwise rocking direction. Such movement rocks the arm 172 counterclockwise, when viewed from the top of the shaft, applying tension to the connecting rod 170, and moving the bottom end of the shifter arm 142 to the left in Figure 5 to throw the gear 135 backwardly into mesh with the reverse idler 132. It will also be evident from the previous description that such engagement of either gear, or the rocking of either of the shifter fork cranks 139 or 150 will set the selector cam locking mechanism to prevent the other of the two forks from being displaced from its neutral gear position.

Normally, the spring 200 at the top of the steering column urges the shift control shaft downwardly, so that the cross pin 182 is seated in the notches 189 on the hub 188. When the cross pin is thus disposed, the handle 206 may be rocked counterclockwise and clockwise when viewed from the top of the steering column. If the handle 206 is rocked counterclockwise, the arm 173 will be rocked counterclockwise, when viewed from the top of the column, to apply tension to the rod 171 and draw the lower end of the shifter arm 152 to the left in Figure 5. This will throw the shifter fork 148, with the synchronizer blocker assembly 146, to the right in Figure 5 to engage the second gear teeth to establish second gear ratio. Similarly, if, from the foregoing lower position of the shift control shaft 174, the handle 206 is rocked clockwise, the cross pin 182, acting in the notches 189, will rock the arm 173 clockwise, when viewed from the top of the steering column, applying thrust to the connecting rod 171 and moving the lower end of the shifter fork arm 152 in Figure 5 to the right, which action moves the fork 148 to the left to engage the direct drive teeth and establish high speed or direct drive 1 to 1 ratio.

The overdrive control

The foregoing main transmission and overdrive operations are illustrated in connection with typical known mechanisms. However, the means for energizing the overdrive cylinder, now to be described, is in the present application interrelated with the transmission shifter to attain particularly advantageous results.

As indicated in Figure 1, the power mechanism 87 is vacuum operated from the intake manifold "M" of the engine through suitable control mechanism.

There is a vacuum conduit 225 that leads from the engine to a selector valve, generally indicated at "SV". From that valve, a pair of conduits 228 and 229 lead into the connections 89 and 90, respectively, at opposite ends of the cylinder 88. Additionally, there lead from the selector valve two speedometer corrector conduits 231 and 232 that pass to a speedometer corrector mechanism, generally indicated at 233.

The selector valve

The selector valve itself is illustrated in Figures 20–23. It includes a central valve body or block 240 that is annular in shape so as to provide a cylindrical bore 241 therethrough.

Within the bore 241, there are oppositely disposed cup-shaped stampings 243 that are placed edge to edge and sealed into the bore 241 to form a central vacuum chamber 244 and to afford two opposite inner valve seats 247 and 248. There are also two end discs 249 that fit over the ends of the valve block 240 and have at their center flanges providing two valve seats 251 and 252. It will be seen that the valve seats 247 and 251 constitute an oppositely spaced inner pair; and the valve seats 248 and 252 likewise provide an opposite outer pair. The discs 249 and the stampings 243 provide two annular valve chambers 253 and 254.

The opposite ends of the valve block likewise receive solenoid coils 255 and 256, respectively, that are enclosed in cups 257 and 258 sealed over the ends of the block 240 with washers of rubber or like interposed. The coil 255 actuates a core 259, having a valve 260 that is movable, when the coil is energized, from engagement with the valve seat 247 into engagement with the valve seat 251, and is spring returned upon deenergization of the coil.

The other coil 256 operates a core 261 that has a valve 262 that is moved from the valve seat 248 to the valve seat 252 when the coil is energized, and is spring returned when the coil is released.

Between the cup 257 and its disc 249 is formed an outer atmospheric chamber 265, and a similar chamber 266 is formed at the other end.

The engine intake manifold connection 225 is introduced into a port 268 extending radially inward into the block 240, and connecting into the vacuum chamber 244, to bring the vacuum to the inner valve seats 247 and 248.

From the annular valve chamber 253, a port 269 connects with the conduit 228. From the other valve chamber 254, a port 270 connects with the other conduit 229.

An atmosphere inlet fitting 271 is connected into a port 272 that extends radially into the valve body 240, terminating short of the bore 241 in a laterally extending bore 273 that leads to the two outer atmospheric chambers 265 and 266.

A speedometer corrector port 274 leads from the annular valve chamber 253, and a similar port 275 leads from the other annular valve chamber 254. These ports connect with the conduits 231 and 232, respectively, that connect oppositely into the speedometer corrector 233.

It may be seen that vacuum is applied by the manifold conduit 225 into the port 268 and the vacuum chamber 244, where it becomes subject to the valves 260 and 262, that are normally both closed inwardly against their inner seats 247 and 248. The conduits 228 and 229 are connected to the annular valve chambers 253 and 254, whereby they receive atmospheric pressure when the valves are released as aforesaid. Such atmospheric pressure is introduced through the fitting 271, the port 272, the lateral port 273, to the outer valve chambers 265 and 266, whence it passes the outer valve seats 251 and 252 into the two annular valve chambers 253 and 254.

By the foregoing arrangement, the opposite sides of the piston 91 of the overdrive power cylinder 88 normally have atmospheric pressure thereon, as also does the speedometer corrector.

The two coils 255 and 256 are suitably insulated from the metal parts. One end of the coil 255 has a terminal 277, and the other end of the coil is grounded. One end of the other coil has a terminal 278 and the other end is grounded.

The selector switch

The operation of the two coils 255 and 256 is regulated by a selector switch "SS". This selector switch is supported upon a bracket 281 that has a curved base portion overlying the bearing 176, and mounted by the screws 178 onto the support 177 at the bottom of the steering column. One preferable mounting includes the provision of an upstanding end 282 (Figures 8, 10, and Figure 11) on the bracket 281 having a hole therethrough. A switch housing 283 has a headed tubular screw 284, as best shown in Figure 11, through one end and secured thereto by a nut 285. The screw 284 projects beyond the nut to pass through the opening in the upstanding end 282 of the bracket, and on the other side of the bracket the screw receives a securing nut 286, by means of which these parts are held together.

The switch has two fixed contacts 290 and 291 mounted on its top panel, which is preferably of insulating plastic material. The contact 290 is connected by a conductor 292 with the terminal 277 of the selector valve coil 255; and the contact 291 is connected by a conductor 293 to the terminal 278 of the other coil 256. The contact 290 is the direct drive contact and the contact 291 establishes overdrive, as will appear.

This switch 280 has a third terminal 294 connected to a conductor 295. This terminal includes a pin 296 mounted insulatively in the switch case 283, preferably in the manner indicated in Figure 11, this pin 296 being threaded at its outer end and extending into the switch case. Within the case, it has a conducting plug 297 on it, the plug having a flange 298. A conducting contact sleeve 299 is slidably mounted on the plug and has a contact flange 300. A relatively light coil spring 301 acts as a yieldable connection between the flanges 298 and 300 to urge the sleeve 299 to the right in the drawings to accommodate overtravel of the plug 297 relatively to the flange 300 for reasons to become apparent.

The screw fitting 284 in the opposite end of the switch case 283 is tubular and receives an insulating sliding pin 303 that thus projects from the inside to the outside of the casing. Within the casing, this pin has a head 304 attached to it, and it is attached to the plug 297, preferably as shown in Figure 11, and a relatively stiff coil spring 305 acts between the head 304 and the head of the screw fitting 284. This spring 305 is capable of overcoming the spring 301 to maintain the sleeve 299 in its leftward position, in which position the head 304 abuts the end of the sleeve 299, and, as shown for example in Figure 10, maintains the movable contact flange 300 in engagement with the fixed contact 290 for the direct drive solenoid. When the pin 303 is moved outwardly of the casing 283, the coil spring 301 will cause the sleeve 299 to move in the same direction. This arrangement accommodates initial disposition of the switch parts to be based upon proper contact of the disc 300 with the fixed contact 290. The engagement of the disc 300 with the other fixed contact 291 is brought about by the spring 301. Hence, overtravel of the pin 303 to the right will not strain or damage these parts.

The outside end of the sliding pin 303 receives an adjustable threaded extension 308 having a head 309 at its outer end. This extension 308 is adjustably screwed into the end of the pin 303, and may be fixed in axial adjusted position by a nut 319. It will be seen that the head 309 is disposed above the shift control shaft 174, somewhat back of the upstanding bearing edge 181 of the bracket 180.

It will be remembered that the shift control shaft 174 is movable axially in a neutral position, and is rockable for the proper gear ratio, in either direction from neutral position. As heretofore described, the mechanism including the cross pin 182 and the pairs of notches 186 and 189 are so arranged that, when either of the two hubs of the arms 172 or 173 is rocked, the pin 182 cannot be shifted axially more than a limited distance, because it would come up against the edge of the other hub member, owing to the fact that the one will have been displaced from neutral position and the other will remain in neutral position.

Means are provided for the limited axial movement of the cross pin 182 from the third gear position only, of all of the gear engaging positions. This third gear position is illustrated in Figure 13, wherein the cross pin 182 is within the notches 189, and the hub 188 and the arm 173 have been rocked to establish third gear drive. Figures 13, 14 and 15 show that the hub 185 is provided with an additional pair of notches or recesses 315. These notches 315, as shown particularly in Figure 14, are disposed angularly with respect to the notches in the hub 185, so that they will be opposite the notches 189 at the time the hub 185 is in neutral position and the hub 188 is in third gear position. By this means, an additional predetermined axial movement of the shifter shaft 174 with the cross pin 182 may be made from the third gear position, while third gear ratio remains established, and pin 182 and slot 189 connected. Furthermore, the axial displacement of the cross pin 182 into the notches or recesses 315 serve to interlock the shift-lever 206 against rotative movement while so positioned, to prevent accidental disengagement of direct drive speed.

Back of the bearing 181 of the bracket 180, the shift control shaft 174 has a finger member 320 formed as part of a band 321 extending around the shaft 174 and held adjustably by a bolt 322 in proper position. The finger 320 is adapted to project upwardly from the shift control shaft 174, so that it may be introduced to the left or to the right of the head 309 on the pin 308, depending upon the axial position of the shift control shaft.

It will be seen that the arm 320 will follow the axial and twisting movements of the shift control shaft 174. In Figure 9, the angular position occupied by the arm 320 when the shift control shaft 174 is in neutral position is indicated at approximately a forty-degree angle to the vertical. When the shaft 174 is rocked to first or third speed positions, the finger 320 will lie adjacent the axis of the pin extension 308.

Thus, when the shifter shaft 174 is in any position other than the first or third gear position, the arm 320 will be entirely displaced angularly from the extension 308 and its head 309, so that it cannot have inter-action with those parts. However, when the first or third gear position is occupied by the shifter shaft 174, the finger 320 will be moved toward the vertical position and toward the axis of the extension 308.

It will be remembered that the first and third positions of the shifter shaft 174 differ axially, and that the shifter shaft is moved upwardly, which is to the right in the drawings, as the initial part of producing first speed drive. This axial displacement of the shaft 174 is sufficient to displace the finger 320 to the right or upwardly beyond the head 309, so that it has no inter-action with the head 309 or the extension 308, when the shaft 174 is then rocked into first gear ratio.

When the shift control shaft 174 is in its third gear position, which is the downward position or the position to the left in the drawings, the finger 320 will be introduced to the left or behind the head 309, preferably with a slight clearance obtained by proper adjustment of the extension 308.

From the position of Figure 8, wherein third gear ratio is established, axial movement of the shifter shaft 174 may be produced, as from this third gear position alone, the pin 182 may pass into the notches 315. In this movement, the finger 320 will move to the position of Figure 10, and in so doing, will engage the head 309 and move the extension 308 to the right in these drawings, which is upwardly of the shaft. This movement will draw the pin 303 and the plug 297 to the right in the drawings, and will compress the spring 305. The lighter spring 301 will move the sleeve 299 and its contact flange 300 from engagement with the contact 290 into engagement with the contact 291. Resilient engagement of the flange 300 with the contact 291 is thus produced by the spring 301, and any overtravel of the pin 308 merely withdraws the disc 304 from the end of the sleeve 299 without producing strain upon the parts.

This movement of the contact disc 300 thereby changes the circuit of the terminal 294 from its initial position in engagement with the contact 290 to the position of Figure 10, wherein it engages with the contact 291. As will appear, such action deenergizes the direct drive solenoid and energizes the overdrive solenoid of the selector valve, when the circuit, including these several contacts, is completed. It may be seen that the selection of overdrive or direct drive is thus made by this positioning of the hand lever 206, involving an axial displacement thereof from the third gear position. It may also be observed that this axial displacement is an updrawing of this hand lever toward the steering wheel, which is the most desirable displacement for this operation.

The interrupter switch

It is preferable that the selection of overdrive not produce a completion of the overdrive shift merely by the shift of the hand lever. It is most desirable that the hand lever merely effect a preselection that is completed by an additional act of the operator, or an additional act of some further control means. In the present and preferred embodiment, this additional act is obtained by a depression of the clutch pedal P.

The clutch CL operates through the clutch pedal P and its clutch lever 330 that is pivoted at 331 behind the frame member F to a crank 332 on a clutch rocker shaft 333 supported on the frame. The shaft 333 has conventional linkage 334 by which it operates the clutch. It also has a lever arm 335 fixed to rock with it, on the outside of the frame. This latter arm is connected to a rod 336 that extends forward through a hole in the frame to an interrupter switch, generally indicated at "IS."

This interrupter switch IS is shown in detail in Figures 24–28. It is supported upon a bracket 340 attached to the engine or other suitable part of the vehicle. It comprises a switch casing 341, having an insulating panel 342 on one side thereof. This panel 342 supports two terminals 343 and 344 that are connected with the conductors 345 and 295. The conductor 345 is connected to one side of the usual battery B through a switch "OS" (Figure 1); and the conductor 295 is connected to the end terminal 294 of the selector switch SS.

The terminal 343 is connected in the interrupter switch with a bracket 347 that is generally U-shaped, as shown in Figure 26, having a pivot pin 348 suspended between the outer ends of the ears of the bracket.

A switch arm 349, that is formed of a generally inverted U-shaped construction, has its legs mounted on the pin 348, so that it may rock from the full-line position to the dotted-line position of Figure 24. At its upper end, the switch arm 349 has a contact 352 that is adapted to swing into engagement with a fixed contact 352 connected with the terminal 344, when the switch arm is moved to the dotted-line position of Figure 24. When the switch arm is moved to the full-line position of Figure 24, the upper end of this arm engages an insulated stop 355.

This switch arm is adapted to be actuated in an over-center manner affording lost-motion and time delay. To accomplish this, the bracket 347 has a lower projection 357 that is slotted inwardly from its outer projecting end. A pivot pin 358 is supported by the downwardly curled ends of the two prongs of the projection, and spans the slot. An overcenter link 359 has its lower end rockable on this pin 358. The link 359 has an enlarged hole 360 in its middle, to receive the switch arm pivot 348, and to accommodate the link to rock relatively thereto.

The upper end of the link 359 is connected by a coil spring 363 with the upper end of the switch arm 349. By this arrangement, when the switch arm 349 and over-center link 359 are aligned in dead-center position, which is vertical in the drawings, the coil spring 363 would be ineffective to produce movement. When the switch arm 349 is moved over center in either direction from the aligned position, the spring will urge the switch arm rapidly to move to the limits of its rocking movement.

The switch arm 349 is displaced by a cam 367 that is engageable with a pin 368 that is mounted between two laterally projecting actuating arms 369 formed as part of the switch lever 349. The cam 369 has a hub 370 supported upon a rock shaft 371, and has two angularly spaced abutment ends 372 and 373. The cam (or rocker member) 367 is non-rotatably mounted on the shaft 371, and this shaft is rockably supported in the switch housing 341. It projects through one wall of the casing. On its outer end, it receives non-rotatably a crank lever 375 to which an adjustable connecting link 376 is pivotally attached, this link having a screw threaded, lock nut attachment 377 by which it can be adjustably attached to the rod 336 actuated by the clutch mechanism.

From the foregoing, it may be seen that, when the link 336 is actuated, the cam 367 will be rocked in one direction or the other. As it approaches a predetermined point in such rocking movement, one of the two shoulders 372 or 373 will strike the pin 368 to rock the switch arm. After the switch arm 349 has passed center position, the snap-action mechanism will cause it to complete its movement rapidly in advance of movement of the cam.

Means retaining shifter in overdrive position

The previously described operation of the hand shift lever 205 through the shift control shaft 174 to the arms 172 and 173 is one that is satisfactory for most purposes. However, it will appear that, in this mechanism that has been described, it is necessary to hold the handle 206 in the overdrive position until the interrupter switch is operated, because the spring 200 will return it to the third speed position when the handle is released.

Means are shown in Figures 27, 28 and 29 for retaining the mechanism in the overdrive position when it is once disposed in said position.

This arrangement involves the extending of the short rod 183 supporting the cross pin 182 out through the end of the bearing 176 and the mounting of a detent mechanism on its outer end. The member 183 is caused to move with the shift control shaft 174, as previously described. This detent mechanism includes a head 390 mounted non-rotatably on the outer end of the rod 183. This head has a transverse opening 391 therethrough that slidably receives a detent pin 392. This detent pin has a head 393 actuated by a spring 394 that is retained by a removable screw cap 395. It will be seen that the detent is normally urged outwardly for engagement with a recess 397 in an arcuate extension 398 of the bracket 180, forwardly of the bearing 176. The detent pin is limited in outward movement by the engagement of its head 393 against a shoulder formed by reducing the size of the opening 391 through the head.

The head 390 is rocked with the shift control shaft 174. In neutral position of that shaft, the head is rocked to the position indicated in Figure 29, and the detent pin is displaced from the flange 398. In reverse and second gear positions of the shaft 174, the head and pin are even further displaced angularly. In first gear position, the pin is aligned with the recess 397, but is axially spaced from it, being closer to the bearing 176, as indicated in Figure 27, than the recess owing to the cross pin 182 being fully engaged in the notches 186. Hence, only in the overdrive position may the detent pin 392 engage in the recess 397 that is located in the top of the arcuate extension 398 of the bracket 180. Registry of the detent pin 392 with its cooperating recess 397 is established by axially displacing the cross pin 182 into the interlock recesses 315, which operation does not disrupt the rotational operative connection between the pin 182 and notches 189 of the shifter arm 173 (see Figures 8, 13, and 15). The spring action of the detent is sufficiently strong to hold the detent releasably in the recess and thereby hold the shifter control shaft 174 against the action of the spring 200. Manual force will overcome the detent.

*Alternate means to accommodate the cross pin for overdrive*

In the previously described mechanism, the shifting into overdrive has involved the provision of additional slots 315 in the hub 185, to accommodate the cross pin 182 on the shifter shaft 174. It is desirable, in some cases, to eliminate this necessity. An arrangement for such purpose is shown in Figures 30–37, as applied to the first described arrangement of the cross pin 182, shown in Figures 13 and 15, without the detent just described.

In this arrangement, the cross pin 182 is mounted in a rod 400, similar to the rod 183, but slidable as a plunger in the hollow shift control shaft 174. The shaft 174 is slotted at 402 to receive the cross pin 182. A coil spring 403 disposed in the lower end of the shaft 174 normally maintains the pin at the upper end of the slot 402, during all shifting of conventional gears. When, however, third gear position is assumed, as Figure 13 shows for the former arrangement, and the handle 206 is lifted to establish overdrive position, the cross pin 182 is drawn upward with upward movement of the shift control shaft 174 only until the cross pin 182 strikes the edge of the hub 185 of the shifter arm 172, which position is shown in Figure 30. Further upward movement of the shift control shaft 174 does not move the plunger rod 400, but rather enables it to remain in the position just noted while the shifter shaft 174 alone moves, the action compressing the spring 403 and displacing the pin 182 to the lower end of the slot 402, as indicated in Figure 33. It will be remembered from Figure 9 that the finger 320 is not adjacent the axis of the extension 308 except in first and third positions, and is back of the head 309 only in third speed position. Hence, the shifting of the shaft 174 in a manner to compress the spring 403 will have no effect upon the extension 308 except from third speed position.

In order to avoid the possibility of damage to the parts if the finger of the selector switch SS is, by an extraordinary condition, abutted forcefully against the head 309 in a lateral direction, means are provided to enable the finger of the selector switch to yield against such action. Figures 30, 32 and 35–37 show such arrangement.

In this arrangement, the finger 320 is rockably mounted on its supporting band. A band 410 is disposed around the shift control shaft 174 and is tightened thereagainst by a bolt 411 that passes through two upstanding clamping extensions on the band. The outer end of one of the extensions has two outstanding ears 412 holding a pivot pin 413. The arm 320 is curved around at its lower end to form a hub 416 rockably mounted on the pin 413. Its movement toward the vertical is limited by opposite shoulders 417 that engage the upper edges of the ears 412. It is yieldably maintained in an upright position by a coil spring 419 that is attached at one end to the arm 320 and at its opposite end to an upstanding projection 420 that projects from the upper edge of the other extension on the band 410.

Figures 30, 35 and 37 show the position of the arm 320 in its normal disposition when it can pass to one side or the other of the head 309 of the pin 308. Figure 36 shows its action when, through the operation previously described, the finger 320 strikes the head 309.

Additional means may desirably be used to insure against lateral abutment of the selector switch finger against the head 309 of the pin 308. This means is shown in Figures 30, 31, 35, and 36. It comprises a lateral flange 425 that may be formed as a projection on the bearing part 181. It is so formed as to provide an overhanging gate edge 426, extending radially inward toward the shaft 174, and conveniently arched concentrically with the shaft. The gate edge has a neutral gate notch 427 provided between two partition elements 428 and 429. The ends 430 and 431 of these partition elements provide gates, as will appear.

A pin 433 is secured in the shaft 174 and projects outwardly to lie alongside the gate edge 426, and to pass through the gate and around the ends 430 and 431, but not across the partitions.

When the shifter shaft 174 is in neutral, the pin 433 will rest to one side of the gate edge 426 in axial alignment with the neutral gate 427. Axial preliminary shifting of the shift control shaft 174 in neutral will move the pin 433 back and forth through the neutral gate 427, across the barriers. When first or reverse is to be established, the shift control shaft 174 is drawn up, pulling the pin through the gate 427 to the upper side of the barriers. Subsequent rocking of the shaft counterclockwise into reverse passes the pin 433 along the upper side of the partition barrier 429 to the gate 431. While the pin 433 is along this partition barrier 429, it is prevented from moving downwardly. Similarly, when the shaft 174 is rocked clockwise into first speed, the pin 433 is restricted by the barrier 430 from axial displacement, until it passes beyond the end 430.

From lower neutral position, the shaft 174 may be rocked similarly to second and third positions, and until the rocking is complete, and the pin 433 reaches one of the ends 430 and 431, it cannot have axial movement across the barriers.

The value of this arrangement can be made particularly evident by consideration of the modification of Figures 30, 32 and 33, wherein the cross pin 182 is floated in the slot 402 by the spring 403. With this arrangement, and with the barrier partition 428, the finger 320 cannot laterally abut the head 309 of the selector switch pin 308. In drawing the shaft upward in neutral for a first gear operation, the shaft must be drawn far enough to clear above the partition 426. In rocking from lower neutral to third speed, the pin 433 must be far enough down to clear below the partition section 429. Any sticking of the pin in a middle part of the slot 402, or any failure to give complete axial displacement to the shaft 174 prior to rocking it, cannot result in driving the finger 320 laterally against the head 309.

Furthermore, this partition arrangement prevents attaining overdrive before third gear is established. With the floating pin 182 of Figures 30, 32 and 33, the operator might partially rock the shaft 174 from neutral toward third gear position, but, prior to mesh, draw upwardly on the shaft. The slot 402 would accommodate this action, and it could result in shifting into overdrive ahead of third. This might be undersirable under certain conditions. It is clear how the partition 426 prevents it by requiring full rocking movement beyond the partition to the third speed gate 431 before axial movement to effect overdrive can be made.

*Operation*

Assuming released, neutral position of the shifter handle 206 and the engine running, the cross pin 182 will be in the bottom of the slots 189 of the hub 188 of the second and third speed steering column shifter arm 173, under the action of the spring 200. The transmission's shiftable elements 135 and 146 will be in neutral and out of engagement with any of their engageable parts. The clutch pedal P will be released to its upper position. The interrupter switch IS will be open. The lead 345 from the battery will, therefore, be disconnected at the interrupter switch. Vacuum will be drawn from the intake manifold M of the engine E into the conduit 225 that leads to the selector valve SV. Both of the valve elements 260 and 262 of this selector valve will be released to their inner positions under the action of their return springs. As a result of this, the vacuum in the vacuum chamber 244 of the selector valve will be prevented from passing through either of the valve seats 247 or 248. Atmospheric pressure will be introduced through the atmospheric fitting 271, the port 272 and the cross port 273 into the two outer valve chambers 265 and 266 of the selector valve. As the two valve elements 260 and 262 are on their inner seats, their two outer seats 251 and 252 will be open, so that the chambers 265 and 266 of the selector valve will both be connected with the annular valve chambers 253 and 254, and atmospheric air will then be introduced into the two conduits 228 and 229. This will put equal pressure on opposite ends of the cylinder 88 of the overdrive mechanism, and the piston 91 will be held immovable.

As will appear, the overdrive mechanism will be in its direct drive condition, as indicated in Figure 4, at this starting time.

The selector switch SS will be in the position of Figure 8, owing to the fact that the shift control shaft 174 is in its lower position, as aforesaid, under the action of the spring 200, and the contact disc 300 of this selector switch will be in contact with the switch contact 290 thereof. However, no circuit will be completed at this time because of the fact that the interrupter switch IS is open.

In any normal shifting operation, the clutch pedal P is depressed, as the first step. Such depression of the clutch pedal applies a tension to the thrust rod 336, connecting the clutch pedal with the interrupter switch, and moves it from the full-line position of Figure 24 to the dotted-line position thereof wherein the switch is closed. This action takes place by virtue of the fact that the tension upon the rod 336 draws the crank arm 375 counterclockwise of the interrupter switch and rocks the rocking element or cam 367. The early part of this movement will produce no action of the interrupter switch because the shoulder 372 is angularly displaced from the pin 368. However, at approximately the time that the clutch pedal approaches the lowest portion of its movement, the shoulder 372 will engage the pin 368 and rock the switch arm 349 clockwise, in Figure 24, about its pivot 348. When this rocking movement has proceeded far enough to align the switch lever 349 and the over-center link 359 in dead-center position, and slightly beyond that, the spring 363 will act to snap the switch lever 349 over into engagement with the contact 353 with a rapid action that is accommodated by the fact that the pin 368 may be momentarily drawn away from the shoulder 373. The interrupter switch will be held closed by the spring 363 as long as the clutch pedal P is held in its depressed position, or released to substantially full clutch-engaged position.

The second step in the operation of establishing any gear ratio is to move the shifter handle 206. If a conventional first gear ratio start is to be made, the handle will be lifted and then drawn clockwise, relatively to the operator, into the first gear position, as indicated in Figure 2. This action is first a drawing up of the handle 206, which, as previously described, initially relieves the force of the spring 200 by the lever action of the hand lever 205, and then draws the entire shaft 174 upwardly because the pivot 207 is contained on the extension 295 that is a part of the shaft 174. Such upward movement of the shaft 174 draws the cross pin 182 upwardly into the slots 186 of the first and reverse hub 185, and clears the pin 182 from the hub 188 entirely.

A reference to Figures 8, 9 and 12, and particularly the latter, will show that this action of drawing the shifter shaft 174 upwardly in the neutral position takes place with the selector switch finger 320 angularly spaced from the head 309 of the pin 308 of that switch, so that no action on the switch is produced. However, the finger 320 will be drawn to a distance along the axis of the pin 308 beyond the head 309.

The second part of this first gear engaging operation, all of which takes place with the clutch pedal P depressed, consisting of rocking the handle 206 clockwise while it is held upwardly, will produce clockwise rocking of the hub 185 and the shifter arm 172. This action follows from the fact that the pin 182 is engaged in the notches 186 of the hub 185 of the first and reverse gear shifter arm 172.

In this action, the shifter fork 137 will be moved to the left in Figure 5 to effect engagement of its gear 135 with the first speed gear 130 on the countershaft, thereby to establish the particular low speed ratio drive through the transmission. At the same time, it will displace the locking cam 160 away from its neutral position, so that the sleeve 164 is prevented from movement, and so that the other shifter fork is held immovable.

After the first speed drive is thus established, the clutch pedal P is released, and the car can move forward in first speed. Release of the clutch pedal applies thrust to the rod 336, and causes the cam 367 to rock clockwise (Figure 24). The initial part of this rocking movement has no effect; but, after a substantial outward release movement of the clutch pedal, the cam 367 will abut its shoulder 373 against the pin 368, and upon further rocking will open the switch. When the switch arm 349 passes beyond dead center, it will be moved to its fully open position by the spring 363. There is thus delayed action of the reopening of this switch, as well as a differential between the clutch pedal position wherein it opens and that wherein it closes.

It will be noted that, when the clutch pedal is first depressed for this operation, or for any other shifting operation, the interrupter switch is closed. Also, the selector switch, as already noted, is in a position wherein the shaft or pin 308 is to the left in Figure 8, and consequently so that the disc contact 300 is closed with the contact 290.

When both the interrupter switch is closed and a contact is made through the selector switch, one of the solenoids of the selector valve will be energized. Whenever the disc contact 300 is closed with the contact 290, this will energize the solenoid that effects direct drive ratio. Such circuit begins from the battery and passes through the conductor 345 to the interrupter switch terminal 343. Then it passes through the bracket 347 and the pivot 348 to the switch arm 349 and its contact 352, the parts of the switch being designed to prevent short circuiting or grounding, in manners known in the art. (It will be understood that the lead 345 may be introduced by a flexible lead directly to the contact 352, which may, if desired, be insulated from the switch arm 349.) With the contact 352 closed with the contact 353, as it will be when the clutch pedal P is depressed, the circuit will continue through the terminal 344 and the lead 295 to the end terminal 294 of the selector switch. From this end terminal, the circuit continues through the pin 296 and the plug 297 to the sleeve 299 and its contact flange 300. In the position described, the circuit continues from the contact disc 300 through the contact 290 and the conductor 292 to the coil 255, which is then energized. It will be observed that the other end of this coil is grounded.

When the coil 255 is energized, its core 259 will be drawn outwardly against its closing spring and its valve 260 will be displaced from its inner valve seat 247 to its outer valve seat 251. The opening of the valve seat 247 will establish vacuum communication between the vacuum chamber 244 and the annular valve chamber 253. The closure of the valve 260 against the outer valve seat 251 will cut this annular valve chamber 253 off from the outer atmospheric chamber 265 of the particular solenoid coil 255. However, it will be remembered that atmosphere is still present in the opposite annular valve chamber 254.

Thus vacuum may be drawn through the conduit 228 while atmosphere is on the other conduit 229. The vacuum drawn in the line 228 is thus applied to the remote end of the cylinder 88 while atmosphere is at the other end, and the atmospheric pressure will drive the piston 91 as far to the right as it can in Figure 3. Normally, the piston 91 will already be at the right to establish the direct drive condition of Figure 4, but if, through some chain of circumstances, the piston 91 has been left in its inner position, establishing overdrive, as shown in Figure 3, the preliminary operation of depressing the clutch at the starting of a shifting sequence will insure the fact that conventional drive will be produced when the shifting operation is completed. Thus the superposition of overdrive onto one of the lower gear drives is prevented.

The foregoing checking of the overdrive power mechanism will be made for each of the conventional shift operations, because the clutch pedal will be depressed and the selector switch, in all conventional gear operations, will remain in the position of Figure 8, completing the circuit to the direct drive solenoid 255.

This establishment of reverse gear ratio is, as will be understood by those in the art, substantially the same as the operation for establishing first speed ratio, except that the hand lever, after being drawn upwarldy to bring the cross pin 182 into the slots 186 of the hub 185, will be moved counterclockwise, so that the shifter arm 172 at the lower end of the steering column is moved counterclockwise and applies tension to the connecting rod 170 attached to the bottom of the shifter arm 142 on the transmission. This will move the gear 135 to the right in Figure 5, rather than to the left, so that it engages with the reverse idler gear 132 and establishes the reverse gear situation in the transmission. The operation of the selector switch, interrupter switch and selector valve remains unchanged, because the finger 320 in the reverse position is moved further away from the axis of the pin 308, as indicated by dashed lines in Figure 9. In the reverse gear position, the finger can have no effect whatever on the head 309.

When it is desired to shift to second speed, the clutch pedal P is depressed, and the handle 206 is rocked back to its neutral position, and is released so that the spring 200 can move the shaft 174 downwardly. This introduces the cross pin 182 again into the slots 189 on the hub 188 of the lower shifter arm 173, and completes neutralizing of the transmission and associated parts. From the foregoing position, the handle 206 is rocked counterclockwise for second speed. This action, through the cross pin 182, rocks the hub 188 and the arm 173 counterclockwise, applying tension to the connecting rod 171 that is connected to the bottom of the other transmission shifter arm 152. This will move the fork 148 to the right, and carry with it the synchronizing blocker assembly 146 in Figure 5. In conventional manner, this will engage the second gear clutch, so that the driven shaft is connected to the second gear 145, which meshes through the second gear of the countershaft constantly and the second gear ratio is established. It becomes effective upon release of the clutch pedal P thereafter.

In the foregoing operation, the clutch pedal P is initially depressed, which again closes the interrupter switch, but, owing to the fact that the selector switch is remaining in its lower position wherein the contact disc 300 still establishes the circuit for the direct drive solenoid 255, the overdrive piston 91 will be held in its direct drive position, to the right in Figure 4. However, this clutch operation again checks the overdrive and insures that it will be in the direct drive position. In second speed, the shaft 174 is turned counterclockwise to bring the selector switch finger 320 to its remote position angularly displaced away from the pin 398.

Thereafter, when third gear is to be established, the clutch pedal P is again depressed, and the handle 206 is merely rocked counterclockwise through the neutral position and down into the third gear position, which is illustrated in Figure 13. This action rocks the arm 173 clockwise, applying thrust to the arm 171 and rocking the fork 148 to the left in Figure 5, moving the synchronizer blocker assembly 146 to the left to complete a direct drive between the driving shaft 126 and the propeller shaft 45 of the vehicle, that becomes effective when the clutch pedal P is released. It will be understood that the selector locking mechanism of Figure 6 operates in the previously described manner to hold the other fork against movement.

This action, preceded as it is by depression of the clutch pedal P, again establishes the previously described circuit to the direct drive solenoid 255 and checks the position of the piston 91 to maintain it in direct drive condition.

However, the clockwise movement of the shifter control shaft 174 from the second gear position, through the neutral position, to the third gear position, introduces the finger 320 to a position adjacent the pin 398. As the shaft 174 is in its lower position, this will bring the finger 320 to the position of Figures 8 and 9, wherein it lies adjacent the pin 398 to the lower side of the head 399 on that pin. As no upward axial movement of the shaft 174 is produced at this time, the pin 398 cannot be moved to bring the contact disc 300 away from the contact 290, and the same circuit to the direct drive solenoid 255 will be maintained.

This shifting operation into third speed ratio can be made with the cross pin 182 at the upper end of the notches 189, so that it bears upon the edge of the hub 185 of the other shifter arm 172. This movement, however, is accommodated for by the lost-motion shown in Figure 30 between the finger 320 and the head 399.

When in third speed ratio, the clutch pedal P may be depressed at any time without changing the condition of the overdrive in the absence of further movement of the handle 206. Thus the normal clutching and de-clutching in high gear may be performed without affecting the present control, other than to check the position of the piston 91 and hold it in direct drive.

From third gear position only, the overdrive may be effected. It is performed by the combination of a clutch operation and a further positioning of the handle 206 from its third gear position. When it is desired to operate the overdrive, the handle 206, without being rocked out of its clockwise, angularly rocked position for third speed, is drawn upwardly from the dash-line position of Figure 2 to the full-line position thereof. As already mentioned, this position is preferably not the same amount of axial movement that is required to bring the shift from the second or third position to the first gear position. When the shift handle 206 is thus drawn up from the third gear position, it draws the cross pin 182 upwardly from the slot 189 into the notches 315 of the upper hub 185, as shown in Figures 14 and 15. This action is sufficient to cause the finger 320 of the selector valve to move against the head 399 of the pin 398, and then to displace the head 399 and the pin 398 from the position of Figure 8 to the position of Figure 10.

As previously described, the movement of the pin 398 compresses the return spring 305 and moves the plug 297 and the pin 303 to the right in the drawings. The spring 301 causes the sleeve 299 to follow until the disc 300 closes with the contact 291. Further movement of the pin 303 withdraws the disc 304 from the end of the sleeve 299, compressing the spring 301, which spring 301 thus accommodates overtravel of the plug 297. This shift of the disc 300 breaks the circuit from the interrupter switch to the drive solenoid 255, and instead makes the circuit from the interrupter switch to the other solenoid coil 256.

When, either concurrently therewith or later, the clutch pedal P is depressed, the interrupter switch will be caused to close in the manner aforesaid. As soon as it does close, the foregoing circuit will be completed from the battery through the lead 345, through a master control switch OS, through the interrupter switch 349, to the selector switch and the contact disc 300. From this contact disc, it continues through the contact 291 and the conductor 293 to the overdrive solenoid valve coil 256. As the other solenoid coil 255 is in a broken circuit, its spring will cause it to remain in its inner position wherein it closes the inner valve seat 247 and opens the outer valve seat 251. The energized overdrive solenoid coil 256 will move its valve 262 away from the inner valve seat 248 and against the outer valve seat 252.

The foregoing disposition of the valves causes the vacuum chamber 244 to be connected through the valve seat 248 to the left-hand annular valve chamber 254, whence the vacuum may be drawn from the other vacuum conduit 229 that leads to the bottom or inner end of the cylinder 87 to the left of the piston 91 in Figure 3. Likewise, the atmospheric connection from the port 272 and the cross port 273 to the two outer chambers 265 and 266 is broken from the annular valve chamber 254 by the engagement of the valve 262 with its valve seat 252. However, this atmospheric pressure in the right-hand solenoid chamber 265 can pass through the open valve seat 249 and thence through the other connecting conduit 228 to the right side of the cylinder 88 in Figure 3. The atmospheric pressure will thereupon act against the piston 91 and move it to its left-hand position. This will shift the overdrive collar 77 in the manner earlier described, so that it establishes the overdrive of Figure 3, rather than the direct drive of Figure 4.

Thereupon, the clutch pedal P is released. During the initial part of the releasing movement, the actuating shoulder 372 of the cam 367 of the interrupter switch moves from the dotted-line position of Figure 24. In the position of Figure 24, the shoulder 373 of the cam is at a considerable angular distance from the pin 368 on the switch arm 349. Consequently, there is a definite lost-motion of predetermined extent, wherein the clutch pedal P moves toward its released position, before the shoulder 373 strikes the pin 368. Thereafter, further movement of the clutch pedal causes the shoulder 373, in its engagement with the pin 368, to move the switch arm 349 away from its contact closing position, and finally over-center, so that the spring 363 returns this arm to its fully open position against the insulated abutment 355.

The foregoing lost-motion has the advantage that the interrupter switch remains closed through a substantial part of the clutch pedal cycle. If the handle 206 is operated concurrently with a clutch pedal operation, there is ample interval of closure of the interrupter switch for the shifting of the selector switch to be completed and for the operation of the solenoid and the consequent movement of the piston 91 and shift of the overdrive mechanism to be completed.

When the clutch pedal P is finally released, and the handle 206 is released with overdrive established, in the first described mechanism of Figure 13, the handle will be returned to its third gear position under the action of the spring 200. This will return the finger 320 to the position of Figure 8, whereupon the relatively heavy coil spring 305 will displace the plug 297 and the pin 303 to the left, causing the flange or head 304, by engagement with the end of the sleeve 299, to return the sleeve 299 and the contact disc 300 from the position of Figure 10 to the position of Figure 8. It will be remembered that, in the position of Figure 8, the contact disc 300 closes the circuit from the interrupter switch to the direct drive solenoid coil 255. The mechanism is then preset, so that, upon a subsequent full declutching cycle, if the handle 206 remains in released position, the overdrive will be automatically shifted back to direct drive condition, because the declutching operation closes the interrupter switch and completes the circuit through the selector switch while it is in the returned position of Figure 8. If it is desired to hold the overdrive in its overdrive condition, despite a declutching operation, the handle 206 may be moved and held in its overdrive position while the clutch pedal is depressed and returned, or the clutch pedal may be adjusted to release the clutch before the pedal is down far enough to close the interrupter switch.

The operation of the modification shown in Figures 30-37 inclusively will be exactly the same, as far as the operator is concerned, as that already described. However, with this modification, the necessity of putting the slots in the upper hub 185 is eliminated. Also, the possibility of damaging the finger 320 and the actuatable switch parts by virtue of the finger 320 striking the edge of the head 309 instead of freely passing below or above said head in shifting into third or first gear respectively, is eliminated. This condition could result from increased tolerances between the shifting arms and linkages due to wear or improper adjustment, or from careless manipulation of the handle 206.

In this modification of Figures 30-37 inclusively, the cross pin 182 is normally urged to the upper ends of the slots 402 by the spring 403. Consequently, when the shifter control shaft 174 is operated by the handle 206, the cross pin 182 will directly follow the movements of the shaft, so that the conventional shifting of the transmission is not altered at all.

When, however, it is desired to engage overdrive from the third gear position, the pin and slot arrangement provides for the moving of the shaft 174 without requiring recesses in the hub 185 to receive the cross pin 182. The start of an overdrive shift will find the pin 182 in the slots 189. When the shaft 174 is drawn upwardly for overdrive, the pin will follow until it strikes the unindented edge of the hub 185 of the other shifter arm. Further movement of the shift control shaft 174 upwardly connot further upwardly displace the pin 182, so that the shaft merely moves the slot 402 relatively along the pin 182 until it reaches the position of Figure 33, which is sufficient upward movement for the displacement of the head 309 of the selector switch pin 308 to establish the overdrive condition of the mechanism.

With this type of arrangement, it is possible to move the shaft 174 upwardly in an axial direction at the same time it is being rocked counterclockwise into third gear position from neutral. Such could cause the finger 320 to abut the lateral edge of the head 309 of the pin 308 before the rocking movement had been completed. This would damage the parts, and so, with the arrangement of Figures 30-34 inclusively, it is preferred to use the yieldable type of selector switch finger shown in Figures 35-37 inclusively. In it, it is impossible to engage overdrive prior to the establishment of third gear speed ratio. If axial movement is imparted to the shaft 174 at the same time it is being rocked into third gear position, and the finger 320 abuts the edge of the head 309, the spring 419 and the yieldably rockable mounting of the finger 320 will accommodate the rocking of the shaft 174 to be completed, while the finger 320 assumes the position of Figure 36. Thereafter, when the handle 206 is released and the spring 200 returns the shaft 174 to its lower position, the finger 320 will drop back of the head 309 and assume the position of Figure 35, wherein it is ready for the subsequent overdrive selection.

The modification of Figures 27, 28 and 29 differs from the earlier type described, in that, when the handle 206 of the shifter control lever is moved from third gear position to overdrive position and released, it will remain in overdrive position until it is manually displaced back to third gear position. This comes about because, when the shift control lever 174 is moved into third gear position and then is pulled upwardly for overdrive position, the detent pin 392 will lock in the detent recess 397 and will be held with sufficient force to overcome the effect of the spring 200. However, the detent yields readily to manual displacement of the handle 206 back to third gear position.

With this modification, the operation differs in that, after the handle 206 has been put in overdrive, it will remain so, and, even wth subsequent declutching operations, the drive will always return to overdrive condition without any necessity of handling the shifter control handle 206, or disturbing the overdrive shifting mechanism.

In all types of the mechanism, the operation must take the drive out of overdrive whenever there is a manual return to direct drive. It is impossible to neutralize the transmission without presetting the overdrive mechanism for its operation into direct drive position.

If the car is stopped while it is in overdrive position, without a declutching operation, or without a return of the piston 91 to direct drive position, and the handle is returned to third gear position or is neutralized, or is put in any of the other conventional shift positions, the selector switch SS will be inevitably returned to direct drive position wherein the movable contact disc 300 engages the fixed contact 299. When this situation exists in the selector switch, any transmission shift engagement with the engine running and normal declutching will immediately cause the overdrive piston to move to its direct drive position, irrespective of whether it may have been left in overdrive or not at the time the car was stopped.

It is impossible, with any except very abnormal driving, to bring the vehicle to a complete stop and shift downwardly into a lower drive without disengaging the overdrive. In other words, it is impossible to super-impose the overdrive on one of the lower speeds than the high gear drive. With the main arrangement shown in Figures 13 and 15, the shift will automatically return to direct drive at any time the clutch pedal is depressed after establishing overdrive unless the handle is again pulled to its overdrive position. Even with the type of Figures 27, 28 and 29, it is impossible to step the shift back to a lower drive without removing the overdrive from its overdrive condition and returning it to direct drive.

In each type of mechanism described, the choice of overdrive or direct drive is made by the selector valve SV. In this valve, the choice derives from the vacuum or atmospheric conditions in the annular valve chambers 253 and 254. When either is open to vacuum, the other is open to atmosphere; and both may be open to atmosphere at once.

The vacuum drawn into the two valve chambers 253 and 254 also is drawn through the speedometer corrector shifter 233. This corrector forms no part of the invention, being a commercial product. Typically, it includes two flexible diaphragm motors, one at the terminal of each of the conduits 231 and 232, and both being connected by snap-action means to a shiftable gear arrangement. When either valve chamber 253 or 254 is on vacuum, and the other on atmosphere, the shifter will be operated. When both chambers are at atmospheric pressure, equal force will be delivered to the device 233, and it will remain as previously shifted. Thus, it determines speedometer drive ratio in accordance with whether overdrive or third gear direct drive is used, and insures proper vehicular speed indications by the speedometer In the present system, there is a first control, illustrated by the hand lever handle 206, that operates into a plurality of positions for choosing a desired gear ratio. From one only of these positions, this first control can be moved to a supplemental position, wherein an additional gear ratio is established. This additional gear ratio is effected without disengagement of the one previously established. With the construction illustrated, the supplemental gear ratio involves the transmission of torque through the ratio previously established and in series, through a supplemental gearing that may be moved between two different gear ratio positions. The principle underlying this construction may be applied to other arrangements, although it has especially practical value in the construction shown.

Another aspect of the control is that the supplemental gearing is illustrated as being power operated. In other words, the supplemental gear ratio is established by relaying chosen control movements to a power mechanism that effects the final shift. The particular applicability of this to an overdrive is apparent.

Further, this mechanism has particular applicability to the arrangement shown wherein the shift is obtained by a hand lever and is regulated by a clutch pedal. However, the cycle of this invention could be used with other arrangements. For example, the direct mechanical operation of the shifter by the hand lever could be changed to one where there is a hand operated mechanism that, by some remote control as known in the art, effects the shifting. The point is that the selector switch must be operated to the overdrive condition only at a desired point, which is, for many reasons, much preferred to be only when the shift is moved from a direct drive, or at least a maximum high speed position, to the overdrive position. The selector switch should preferably be returned always to conventional drive whenever the shifting control is displaced for conventional drive, in order to prevent superposing overdrive on the conventional drive ratios below the top one. Of course, the overdrive could be of opposite ratio superposed on a minimum lower speed drive.

It will be understood that other modifications and variations will be readily apparent to those skilled in the art from the preceding description of presently preferred embodiments of the invention which are for illustrative purposes only, and it is not intended to limit the invention in its broader aspects except as set forth in one or more of the claims appended hereto.

I claim as my invention:

1. In a control for shiftable change-speed transmissions having a plurality of different speed drives, a shift control member having rotational movement connection in a first direction for speed drive selection and in a second axial direction at an angle to the first direction to an operating position for effecting a chosen speed drive without disrupting the rotational connection, control mechanism to effect another speed drive having a movable element, means on the shift control member operatively engageable with the movable element only when the control member is moved in its second direction to the operating position, said control member being supplementally movable parallel to its first direction from said operating position, with said engageable means in engagement with the element, whereby said control mechanism may effect said other speed drive.

2. In a control for shiftable change-speed transmission mechanisms having a plurality of different speed drives on a vehicle having a steering column, a hand shift lever on the column having connections movable axially along the column and then transversely thereto, for selectively establishing said speed drives, said hand lever having supplemental movement in a direction along the column from one of its positions to which it has been moved transversely of the column without disrupting the transverse connection, and mechanism including means operated by said hand lever in its supplemental movement, to establish another speed drive.

3. In a control for shiftable change-speed transmission mechanisms having a plurality of different speed drives on a vehicle having a steering column, a hand shift lever on the column having connections movable axially along the column and then transversely thereto, for selectively establishing said speed drives, said hand lever having supplemental movement in a direction along the column and upwardly thereof, from one of its positions to which it has been moved transversely of the column without disrupting the transverse connection, and mechanism including means operated by the hand lever in its supplemental movement upwardly of the column, to establish another speed drive.

4. In a control for shiftable change-speed transmission mechanisms having a plurality of different speed drives, mechanism including a shifter element movable in a connected relation with said transmittion, in a first line, and in lines transverse to said first line to operating positions, for selectively establishing said speed drives, mechanism for effecting another speed drive, including a switch device movable from a first position to a second position and means energized when the switch device is in second position, and switch operating means operatively connected to the shifter element and engageable to operate the switch device when the shifter element moves from one operating position parallel to said first line without disrupting the transverse line connection between the shifter element and transmission.

5. In a control for transmission mechanisms having a plurality of different speed drives, a shifter element movable into a plurality of operating positions to establish different speed drives, and having supplemental movement from a chosen one operating position, a switch device having two switching positions, means yieldably urging the switch device into a first position, a speed drive selector device, operable from a first position, maintaining the speed drive of said one operating position of the shifter element, to a second position establishing another speed drive, said selector device having an operating means for providing each of its positions, respectively, one operating means being connected with the switch device in its first position, and the other being connected with the switch in its second position, means connecting the shift lever with the switch device only when the shifter element moves to said one operating position, said means being thereafter adapted to move the switch device to second position when the shifter element is given its supplemental movement.

6. In a shifter device, a shift control element having movement in a first direction and movement transversely of said first direction to two operating positions to establish different speed drives, switch means supported adjacent said control element, the switch means having movable means movable between a first switching position and a second switching position, a switch operating member for moving the movable means extending adjacent to the shift control element, and connecting means between the shift control element and the switch operating member engaged to move the operating member only when the shift control element is moved to a predetermined one of its operating positions, said control element having supplemental movement from said operating position, said supplemental movement of the control element being parallel to said first direction.

7. In a shifter device, a shift control element having movement in a first direction and movement transversely of said first direction to two operating positions to establish different speed drives, switch means supported adjacent said control element, the switch means having movable means movable between a first switching position and a second switching position, a switch operating member for moving the movable means extending adjacent to the shift control element, and connecting means between the shift control element and the switch operating member engaged to move the operating member only when the shift control element is moved to a predetermined one of its operating positions, said control element having supplemental movement from said operating position, said supplemental movement of the control element being parallel to said first direction, said connecting means comprising an engaging element connected with the shift control element and movable therewith, said switch means having its operating member disposed for engagement by said engaging element only when the shift control element is in its said one operating position.

8. In a control for transmission mechanisms having a plurality of different speed drives, a shifter element movable into a plurality of operating positions to establish different speed drives, and having supplemental movement from a chosen one operating position, a switch device having two switching positions, means yieldably urging the switch device into a first position, a speed drive selector device, operable from a first position, maintaining the speed drive of said one operating position of the shifter element, to a second position establishing another speed drive, said selector device having an operating means for providing each of its positions, respectively, one operating means being connected with the switch device in its first position, and the other being connected with the switch in its second position, means connecting the shift lever with the switch device only when the shifter element moves to said one operating position, said means being thereafter adapted to move the switch device to second position when the shifter element is given its supplemental movement, said switch operating member comprising a head movable parallel to said first direction, said connecting means including an element movable laterally toward the axis of movement of the head, when the shift control element is moved transversely to said one operating position, until it is aligned with said head in said direction of movement of the head, said supplemental movement of the shift control element causing the connecting element to displace the head of the switch operating member.

9. In a control for transmission mechanisms having a plurality of different speed drives, a shifter element movable into a plurality of operating positions to establish different speed drives, and having supplemental movement from a chosen one operating position, a switch device having two switching positions, means yieldably urging the switch device into a first position, a speed drive selector device, operable from a first position, maintaining the speed drive of said one operating position of the shifter element, to a second position establishing another speed drive, said selector device having an operating means for providing each of its positions, respectively, one operating means being connected with the switch device in its first position, and the other being connected with the switch in its second position, means connecting the shift lever with the switch device only when the shifter element moves to said one operating position, said means being thereafter adapted to move the switch device to second position when the shifter element is given its supplemental movement, said switch operating member comprising a head movable parallel to said first direction, said connecting means including an element movable laterally toward the axis of movement of the head, when the shift control element is moved transversely to said one operating position, until it is aligned with said head in said direction of movement of the head, said supplemental movement of the shift control element causing the connecting element to displace the head of the switch operating member, said connecting element being attached to the connecting means by means yieldable to enable the element to move when abutted against the head in said transverse movement of the shifter element.

10. In a control for change-speed transmissions having a plurality of different speed drives, a first control element movable from a first position to a second position and back in connected relation with said transmission, a second control element movable from inoperative position into operative position with a fixed element and back to inoperative position, operating means movable in advance from a first position to a second position, and back, connections between the operating means and the second control to effect movement of the second control from inoperative to operative position at one point in the advance movement, and to effect return of the second control to inoperative position at a different point in the backward movement of the operating means, and means operated when the first control is in second position and the second control is in operative position, to produce a change in speed drive.

11. In a control for change-speed transmissions having a plurality of different speed drives, a first control element movable from first position to second position and back in connected relation with said transmission, a second control movable from inoperative into operative position with a fixed element and return, operating means movable in advance from a first to a second position, and back, means normally urging the operating means to its first position, connections between the operating means and the second control from inoperative to operative position at a point in the advance movement of the operating means, and to return the second control to inoperative position at a point nearer first position of said operating means than said first point, and means operated when the first control is in second position and the second control is in operative position, to produce a change in speed drive.

12. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means and the interrupter switch having means to move the interrupter switch to operative position at a predetermined point in the forward movement of the second operating means, and having means to return the interrupter switch to inoperative position at a different point nearer the first position of the second operating means than said first predetermined point, and means to change the speed drive, energized when the first switch is in second position and the interrupter switch is in operative position.

13. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means and the interrupter switch having means to move the interrupter switch to operative position at a predetermined point in the forward movement of the second operating means, and having means to return the interrupter switch to inoperative position at a different point nearer the first position of the second operating means than said first predetermined point, means to effect one speed drive when the first switch is in first position and the interrupter switch is in operative position, and means to effect a different speed drive when the first switch is in second position and the interrupter switch is in operative position.

14. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means and the interrupter switch having means to move the interrupter switch to operative position at a predetermined point in the forward movement of the second operating means, and having means to return the interrupter switch to inoperative position at a different point nearer the first position of the second operating means than said first predetermined point, means to effect one speed drive when the first switch is in first position and the interrupter switch is in operative position, means to effect a different speed drive when the first switch is in second position and the interrupter switch is in operative position, and means normally urging the second operating means to its first position.

15. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means and the interrupter switch having means to move the interrupter switch to operative position at a predetermined point in the forward movement of the second operating means, and having means to return the interrupter switch to inoperative position at a different point nearer the first position of the second operating means than said first predetermined point, means to effect one speed drive when the first switch is in first position and the interrupter switch is in operative position, and means to effect a different speed drive when the first switch is in second position and the interrupter switch is in operative position, said second operating means comprising a pedal with means yieldably maintaining it in first position.

16. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means the interrupter switch having means to move the interrupter switch to operative position at a predetermined point in the forward movement of the second operating means, and having means to return the interrupter switch to inoperative position at a different point nearer the first position of the second operating means than said first predetermined point, means to effect one speed drive when the first switch is in first position and the interrupter switch is in operative position, and means to effect a different speed drive when the first switch is in second position and the interrupter switch is in operative position, said second operating means comprising a clutch pedal for connection with a clutch associated with the transmission.

17. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means and the interrupter switch having means to move the interrupter switch to operative position at a predetermined point in the forward movement of the second operating means, and having means to return the interrupter switch to inoperative position at a different point nearer the first position of the second operative means than said first predetermined point, and means to change the speed drive, energized when the first switch is in second position and the interrupter switch is in operative position, said first operating means comprising a shift lever for effecting different speed drives upon movement to different positions, and connections between said lever and the first switch.

18. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means and the interrupter switch having means to move the interrupter switch to operative position at a predetermined point in the forward movement of the second operating means, and having means to return the interrupter switch to inoperative position at a different point nearer the first position of the second operating means than said first predetermined point, and means to change the speed drive, energized when the first switch is in second position and the interrupter switch is in operative position, said first operating means comprising a shift lever operatable to different operating positions to effect different speed drives, and having supplemental movement from one operating position, and connections between the shift lever and the first switch to move it to second position only when the shift lever is moved in its supplemental movement.

19. In a control apparatus for transmission mechanisms having a plurality of different speed drives, a first operating means movable from a first to a second position, a selector switch moved by the first operating means from a first to a second position, a second operating means movable forward from a first to a second position and backward to first position, an interrupter switch movable from an inoperative to an operative position, connections between the second operating means and the interrupter switch having means to move the interrupter switch to operative position at a predetermined point in the forward movement of the second operating means, and having means to return the interrupter switch to inoperative position at a different point nearer the first position of the second operating means than said first predetermined point, and means to change the speed drive, energized when the first switch is in second position and the interrupter switch is in operative position, said first operating means comprising a shift lever operatable to different operating positions to effect different speed ratios, and having supplemental movement from one operating position, and connections between the shift lever and the first switch to move it to second position only when the shift lever is moved in its supplemental movement, and said operating means comprising a connection for operation by a clutch lever of a clutch associated with the transmission, said connection being in first position when the clutch lever is released and in clutch-engaging position.

20. In a transmission control, a shifter shaft, a pair of shifter arms, the shaft being axially and rotatively movable relatively to the arms, an engagement member on the shaft, engagement member receiving means on each arm, whereby axial movement of the shaft will interengage the engagement member with the receiving means of one arm and free it from the other arm, and the engaged arm may be rocked with the shaft without moving the free arm to operating positions, axial movement of the shaft, upon rocking of one arm, being limited by abutment of the engagement member against the other arm beyond its receiving means, means accommodating supplemental axial movement of the shifter shaft from one predetermined operating position of one arm, said means being shaped to prevent rocking movement of the shaft without returning the rocked arm to its initial position, and actuated means operated by the aforesaid supplemental axial movement of the shaft.

21. In a transmission control, a shifter shaft, a pair of shifter arms, the shaft being axially and rotatively movable relatively to the arms, an engagement member on the shaft, engagement member receiving means on each arm, whereby axial movement of the shaft will interengage the engagement member with the receiving means of one arm and free it from the other arm, and the engaged arm may be rocked with the shaft without moving the free arm to operating positions, axial movement of the shaft, upon rocking of one arm, being limited by abutment of the engagement member against the other arm beyond its receiving means, means accommodating supplemental axial movement of the shifter shaft from one predetermined operating position of one arm, said means being shaped to prevent rocking movement of the shaft without returning the rocked arm to its initial position, and actuated means operated by the aforesaid supplemental axial movement of the shaft, said actuating means comprising a speed drive selector means supported adjacent the shaft, an operating element on the shaft moved to a starting position for operating the selector means by disposition of the shaft in position to establish said one predetermined operating position of said one arm, and moved to actuate the selector means upon supplemental axial movement of the shaft, and mechanism rendered operative by actuation of the selector means to change the speed drive.

22. In a transmission control, a shifter shaft, a pair of shifter arms, the shaft being rockably and axially movable relatively to the arms, opposed facing notches in the arms, a cross pin mounted on the shaft, for selective axial movement into the notch of either arm, and subsequent rocking of said arm by rocking of the shaft into operating position, the other arm limiting axial movement of the pin and shaft after such rocking, and means accommodating supplemental axial movement of the shaft from said operating position, said means being shaped to prevent reverse rocking of the pin without reverse rocking of the previously rocked shaft.

23. In a transmission control, a bracket, a shifter shaft rotatably and rockably supported in the bracket, a pair of shifter arms on the shaft, means for selectively engaging the shaft and either arm by opposite axial movement of the shaft, said engaging means causing the engaged arm to rock, upon subsequent rocking of the shaft, into operating positions, means accommodating supplemental axial movement of the shaft from a selected one operating position, a selector device mounted on the bracket and having an operating element movable parallel to the shaft axis, an actuating member rocked to adjacent the operating element only when the shaft is moved to said selected one operating position, interengaging means between the operating element and actuating member engaged for movement of the operating element when the actuating member is axially moved by the aforesaid supplemental axial movement of the shaft, said means accommodating said supplemental axial movement comprising additional notches in the unmoved arm, angularly removed from the first mentioned notches therein.

24. In a transmission control, a bracket, a shifter shaft rotatably and rockably supported in the bracket, a pair of shifter arms on the shaft, means for selectively engaging the shaft and either arm by opposite axial movement of the shaft, said engaging means causing the engaged arm to rock, upon subsequent rocking of the shaft, into operating positions, means accommodating supplemental axial movement of the shaft from a selected one operating position, a selector device mounted on the bracket and having an operating element movable parallel to the shaft axis, an actuating member rocked to adjacent the operating element only when the shaft is moved to said selected one operating position, interengaging means between the operating element and actuating member engaged for movement of the operating element when the actuating member is axially moved by the aforesaid supplemental axial movement of the shaft, said means accommodating said supplemental axial movement comprising a slot in the shaft to receive the cross pin, limit its rotation relatively to the shaft, but provide axial movement between the pin and the shaft, and means yieldably holding the pin away from one end of the slot.

25. In a transmission control, a bracket, a shifter shaft rotatably and rockably supported in the bracket, a pair of shifter arms on the shaft, means for selectively engaging the shaft and either arm by opposite axial movement of the shaft, said engaging means causing the engaged arm to rock, upon subsequent rocking of the shaft, into operating positions, means accommodating supplemental axial movement of the shaft from a selected one operating position, a selector device mounted on the bracket and having an operating element movable parallel to the shaft axis, an actuating member rocked to adjacent the operating element only when the shaft is moved to said selected one operating position, interengaging means between the operating element and actuating member engaged for movement of the operating element when the actuating member is axially moved by the aforesaid supplemental axial movement of the shaft, and detent means yieldably holding the shaft in position to which it is moved by said supplemental movement.

26. In a control for transmission mechanism providing a plurality of different speed drives and neutral, and an overdrive shiftable from one speed drive to another, a shifter element movable to a plurality of operating positions and to neutral positions to operate the transmission mechanism to different speed drives and neutral, first control means connected for operation by the shifter element, said control means being adapted to preset the overdrive for its first speed drive when the shifter element is in a selected position, and to preset the overdrive for its second speed drive when the shifter element is moved from said selected position to an overdrive position, second control means operable independently of the shifter element, from an inoperative to an operative position, said second control means being connected to effectuate the shifting of the overdrive preselected by the first control means, and means normally yieldably urging the first control means into position to automatically preset the overdrive for its first speed drive.

27. In a control for transmission mechanism providing a plurality of different speed drives and neutral, and an overdrive shiftable from one speed to another, a shifter element movable to a plurality of operating positions and to neutral positions to operate the transmission mechanism to different speeds and neutral, first control means connected for operation by the shifter element, said control means being adapted to preset the overdrive for its first speed when the shifter element is in a selected position, and to preset the overdrive for its second speed when the shifter element is moved from said selected position to an overdrive position, second control means operable independently of the shifter element, from an inoperative to an operative position, said second control means being connected to effectuate the shifting of the overdrive preselected by the first control means, and detent means yieldably holding the first control means in position to automatically preset the overdrive for its second speed when initially moved to said position by the shifter element.

28. In a control for a transmission mechanism having two different speed drives, presettable means movable from a first position to a second position, mechanism operated by movement of the presettable means from first to second position to preselect the second speed drive, mechanism operated by movement of the presettable means from second to first position to preselect the first speed drive, means normally yieldably urging the presettable means to first position, and an additional control means movable to operating position to effect whichever speed drive is preset by movement of the presettable means.

29. In a control for a transmission to establish different speed drives thereof, and an overdrive, a hand lever movable from a speed drive position to overdrive position, mechanism operated by movement of the hand lever to overdrive position to preset an overdrive operation, mechanism operated by movement of the hand lever to the speed position to preset a speed drive operation, a second control member movable to operating position and when in operating position, being adapted to effect whichever of the speed drive and overdrive operations is preset by the hand lever, and means normally urging the hand lever to the speed drive position so that after establishment of overdrive, a subsequent operation of the second control may reestablish said speed drive.

30. In a control for shifting transmissions having a plurality of different speed drives, a shifter member having first movement in one direction and second movement in a direction transversely thereto, a control device having an actuating portion with a head thereon, projecting parallel to said first direction, the actuating portion being movable in said second direction, a projection on the shifter member and movable therewith, the projection being movable toward the axis of the actuating portion by said movement of the shifter member in its first direction, to dispose the actuating portion to one side of the head, subsequent movement of the shifter member in its second direction moving the actuating portion, and means for adjusting the head on the actuating portion in the direction of movement of the actuating portion.

31. In a control for shifting transmissions having a plurality of different speed drives, a shifter member having first movement in one direction and second movement in a direction transversely thereto, a control device having an actuating portion with a head thereon, projecting parallel to said first direction, the actuating portion being movable in said second direction, a projection on the shifter member and movable therewith, the projection being movable toward the axis of the actuating portion by said movement of the shifter member in its first direction, to dispose the actuating portion to one side of the head, subsequent movement of the shifter member in its second direction moving the actuating portion, and means for adjusting the initial relative positions of the head and the projection, in the direction of movement of the actuating portion.

32. In a control for shifting transmissions having a plurality of different speed drives, a shifter member having first movement in one direction and second movement in a direction transversely thereto, a control device having an actuating portion with a head thereon, projecting parallel to said first direction, the actuating portion being movable in said second direction, a projection on the shifter member and movable therewith, the projection being movable toward the axis of the actuating portion by said movement of the shifter member in its first direction, to dispose the actuating portion to one side of the head, subsequent movement of the shifter member in its second direction moving the actuating portion, there being a support for the shifter member and for the control device whereby the control device is supported in fixed relationship to the shifter member.

33. In a control for shifting transmissions having a plurality of different speed drives, a shifter member having first movement in one direction and second movement in a direction transversely thereto, a control device having an actuating portion with a head thereon, projecting parallel to said first direction, the actuating portion being movable in said second direction, a projection on the shifter member and movable therewith, the projection being movable toward the axis of the actuating portion by said movement of the shifter member in its first direction, to dispose the actuating portion to one side of the head, subsequent movement of the shifter member in its second direction moving the actuating portion, and means providing yieldability of the projection in the first direction, to prevent damage to the parts if the projection engages the head prior to completion of movement in said first direction.

34. In a shifter control, a shift control shaft movable in an H-pattern, by longitudinal movement across the bar of the H, and rocking movement along the legs of the H, two shifter elements, having facing notches and a cross pin device in the shaft movable from one notch to the other by said longitudinal movement of the shaft, a projection extending from the shaft, a gate member fixed relatively to the shaft adjacent the projection, the gate member being transverse to the shaft, and having an opening to accommodate the projection to move from one side to the other of the gate in longitudinal movement of the shaft across the bar of the H, having no opening at one end, and having another opening at the other end to accommodate additional longitudinal movement of the shaft that shifts the projection from one side to the other, only at the other end of the gate, the displacement of the shaft along one leg of the H being adapted to dispose the projection adjacent said other opening, and a shifter control device operated by longitudinal movement of the shaft as it displaces the projection through said other opening.

35. In a transmission control; a bracket; a shifter shaft supported in said bracket for rotative and axial movements; a pair of shifter arms on said shaft; means for selectively engaging the shaft and either arm by opposite axial movements of the shaft, said engaging means causing the engaged arm to rotate upon subsequent rotating of the shaft into selected operative positions; means for producing supplemental axial movement of the shaft from a selected one operating position thereof; a selector device mounted on the bracket and having an element movable parallel to the shaft axis to different operating positions; an actuator rotated to adjacent the movable element only when the shaft is disposed in said selected one operating position; and interengaging means between the movable element and actuator, engaged for movement of the movable element when the actuator is axially moved by the aforesaid supplemental axial movement of the shaft.

36. In mechanism for controlling a two-speed ratio gearing for driving the axle of a motor vehicle, said gearing being in turn driven by a variable-speed gear transmission selectively controlled by a gear-shift lever having a preselective supplemental movement from an operative speed position thereof, and an associated clutch controlled by a pedal; motor-power means operable for controlling said gearing; electromagnetically operated valve means for controlling the operation of said motor; a source of electrical energy; circuit means connecting said source to said valve means through a switch controlled by said pedal, and a selective switch controlled by said gear-shift lever for jointly energizing said valve means to open condition for causing said motor to control said two-speed gearing alternately from one speed to the other in response to selective switch closing settings of said gear-shift lever at will within its aforesaid supplemental range of movement while said transmission is disposed operatively in a speed, and said pedal-controlled switch is closed by a de-clutching movement thereof.

37. In mechanism for controlling a two-speed ratio gearing for driving the axle of a motor vehicle, said gearing being in turn driven by a variable-speed gear transmission selectively controlled by a gear-shift lever having a preselective supplemental movement from an operative speed position thereof, and an associated clutch controlled by a pedal; motor-power means operable for shifting said gearing; electromagnetically operated valve means for controlling the operation of said motor; a source of electrical energy; circuit means connecting said source to said valve means through a switch controlled by said pedal, and a selective switch controlled by said gear-shift lever for jointly energizing said valve means to open condition for causing said motor to shift said two-speed gearing alternately from one speed to the other in response to selective switch closing settings of said gear-shift lever at will within its aforesaid supplemental range of movement while said transmission is disposed operatively in high gear, and said pedal-controlled switch is closed by a de-clutching movement thereof.

38. In a change-speed shifter mechanism, a shift control element movable rotationally and axially, a shifting device operatively connected to effect a selected speed by a rotational movement of the control element to a predetermined position, and to accommodate axial displacement of the control element into a supplemental position substantially normal to the predetermined position thereof without disrupting the aforesaid rotational operative connection, switch means supported adjacent said control element, the switch means having movable means movable parallel to said first axial direction between a first switching position and a second switching position, a switch operating member for actuating the movable means extending adjacent and parallel to the shift control element, and connecting means movable with the shift control element and extending between the shift control element and the switch operating member, said connecting means being movably engageable to actuate the operating member only when the shift control element is moved to and disposed in its predetermined rotative position, said switch operating means being actuated by the movable axial displacement of the shift control element into its supplemental position.

39. In a change-speed shifter mechanism, a shift control element movable rotationally and axially, a shifting device operatively connected to effect a selected speed by a rotational movement of the control element to a predetermined position, and to accommodate axial displacement of the control element into a supplemental position substantially normal to the predetermined position thereof without disrupting the aforesaid rotational operative connection, a switch device including a contact member having two switching positions, an operating member for moving said contact member to said two positions and means yieldably urging the contact member into a first position, a speed-drive selector device operable from a first position at which the selector device maintains the speed-drive of said predetermined position of the shift element to said supplemental position establishing another speed-drive, said selector device including an operating means for providing each of its positions, respectively, one operating means being connected with the switch device in its first position and the other operating means being connected with the switch in its second position, switch-actuating means connecting the shift control element with the switch device only when the shift element is moved rotatably to said predetermined operating position, said last-mentioned means being thereafter adapted to move the switch device to its second position when the shift element is given its supplemental axial movement, said operating member having an abutment head movable in a predetermined path, the switch-actuating means comprising a member connected with the shift control element to be moved thereby, the abutment head being located for engagement by the connected member of the connecting means only when the shift control element is moved to said one operating position.

40. In a control mechanism for a power-operated shifting device having two different speed ratios, a manual member operatively connected to shift one of the speeds to effective position by a rotational movement thereof to a first position, said operative connection accommodating axial movement of said manual member to a second position without disrupting the rotational operative connection thereof, yieldable means normally urging the first manual member to its position, a pedally-operated member movable from a first to a second position, mechanism operated by the pedally-operated member in its second position and the manually-operated member in either of its positions to cause the transmission to provide a speed ratio corresponding to the position of the manual member, said pedally-operated member being movable to its second position only after its first position has been established and said pedally-operated member being movable from its first position to its second position only, whereby when the manual member is displaced against the yieldable means from its first position to its second position and the pedally-operated member is operated to its second position, the mechanism will provide the one speed ratio, and when the manual member is moved under the influence of said yieldable means to its first position and the pedally-operated member is again operated to its second position, the mechanism will provide the other of said speed ratios.

41. In a control mechanism for a power-operated shifting device having two different speed ratios and adapted for use in a vehicular drive system having an engine, a propeller shaft and a torque control device for regulating the delivery of torque from the engine to the propeller shaft; the improvements which comprise a manual member operatively connected to shift one of the speeds to effective position by a rotational movement thereof to a first position, said operative connection accommodating axial movement of said manual member to a second position without disrupting the rotational operative connection thereof, yieldable means normally urging the manual member to its first position, a pedally-operated member movable from a first to a second position, mechanism operated by the pedally-operated member in its second position and the manually-operated member in either of its positions to cause the transmission to provide a speed ratio corresponding to the position of the manual member, said manually-operated member being movable to its second position only after its first position has been established and pedally manually-operated member being movable from its first position to its second position only, whereby when the manual member is displaced against the yieldable means from its first position to its second position and the pedally-operated member is operated to its second position, the mechanism will provide the one speed ratio, and when the manual member is moved under the influence of said yieldable means to its first position and the pedally-operated member is again operated to its second position, the mechanism will provide the other of said speed ratio, the pedally-operated member being a control for the torque-control device.

42. In a control for transmissions having two different speed drives, electrically operable mechanism having energizable means including one circuit branch energizable to establish a first speed drive and a second circuit branch energizable to establish a second speed drive; and mechanism for selectively energizing said circuit branches; including a first switch means having a first and a second operating position; a manually-operable control member movable from a first position wherein it closes the switch means to its first operating position only after said first speed drive has been established, to a second position wherein it closes the switch means to its second operating position, said control member being operable to pre-select said second speed drive; a pedally-operated control device movable from a first position to a second position; and a second control switch movable by said last-named control device to corresponding first and second positions; the first circuit branch being energizable only when said first switch means is in its first operating position and said second control switch is in its second operating position to establish said first speed drive; and said second circuit branch being energizable only when said first switch means is in its second operating position and said second switch is in its second position, and said second switch in first position being adapted to open both circuit branches.

43. In a control for a transmission having a plurality of different gear ratios and an additional overdrive ratio, a selector switch having two contacts and a movable element, means normally retaining said element in contact with a first one of said contacts, means to shift the movable element into engagement with the second of said contacts, a separate movable control member movable from first to second position, and a second switch moved to closed position by movement of said separate control member to its second position, energizable power means for selectively establishing said predetermined one gear ratio and said overdrive ratio, a first circuit branch for the power means adapted to be energized through the first contact of the selector switch and through the second switch when closed, said power means being adapted to establish said predetermined one of said gear ratios when energized by said first circuit branch, and a second circuit branch adapted to be energized through the second contact of the selector switch and through the second switch when closed, said power means being adapted to establish said overdrive ratio when energized by the second circuit branch, the means for shifting the movable element of the selector switch constituting a master control operable independently of the position of the power means.

44. The combination of claim 43, wherein the means for shifting the movable element of the selector switch is manually-operatable.

45. The combination of claim 44 wherein the manually-operatable member is movable from neutral to an operating position to establish said predetermined one gear ratio, and movable from said operating position to a supplemental position in which latter movement only it moves the movable element of the selector switch to cause establishment of said overdrive ratio.

46. The combination of claim 43, wherein the transmission is used with an engine delivering torque to a shaft, and wherein means is provided to regulate the torque delivery, said second control member being connected to relieve torque delivery when the second switch is closed.

47. In a control for variable-speed drive transmissions; a manually-operable lever movable into different positions in operatively connected relationship with said transmission for selectively effecting neutral and the different speed drives; interlocking means associated with the operative connection between the lever and transmission; means providing unidirectional supplemental movement of the lever from an effective speed drive position thereof to a supplemental position substantially normal to the plane of the lever movement to its aforementioned speed drive effective position; mechanism including means operated by said supplemental movement of the lever, to effect another associated speed drive, and to render the interlocking means effective to prevent movement of the lever while supplementally positioned without disrupting the operative connection between the lever and the first-named speed drive in effective position.

GLENN T. RANDOL.

REFERENCES CITED

The following references are of record in the file of this patent:

UNITED STATES PATENTS

| Number | Name | Date |
|---|---|---|
| 1,082,624 | Crouse et al. | Dec. 30, 1913 |
| 1,720,989 | Ahlm | July 16, 1929 |
| 2,066,873 | Barnes | Jan. 5, 1937 |
| 2,098,691 | Neff | Nov. 9, 1937 |
| 2,106,292 | Badertscher | Jan. 25, 1938 |
| 2,110,994 | Linsley | Mar. 15, 1938 |
| 2,136,721 | Maurer | Nov. 15, 1938 |
| 2,141,096 | Thurber | Dec. 20, 1938 |
| 2,202,949 | Girardi et al. | June 4, 1940 |
| 2,263,400 | Schwarz | Nov. 18, 1941 |
| 2,348,424 | Shorter | May 9, 1944 |
| 2,365,732 | Snow | Dec. 26, 1944 |
| 2,532,945 | Robinson | Dec. 5, 1950 |